US012021846B2

(12) United States Patent
Van de Groenendaal et al.

(10) Patent No.: US 12,021,846 B2
(45) Date of Patent: *Jun. 25, 2024

(54) TECHNOLOGIES FOR ATTESTING A DEPLOYED WORKLOAD USING BLOCKCHAIN

(71) Applicant: Intel Corporation, Santa Clara, CA (US)

(72) Inventors: Johan Van de Groenendaal, Portland, OR (US); Alberto J. Munoz, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 245 days.

This patent is subject to a terminal disclaimer.

(21) Appl. No.: 17/561,431

(22) Filed: Dec. 23, 2021

(65) Prior Publication Data

US 2022/0116365 A1 Apr. 14, 2022

Related U.S. Application Data

(63) Continuation of application No. 16/023,264, filed on Jun. 29, 2018, now Pat. No. 11,223,606.

(51) Int. Cl.
*H04L 9/40* (2022.01)
*G06F 8/65* (2018.01)
(Continued)

(52) U.S. Cl.
CPC ............ *H04L 63/0428* (2013.01); *G06F 8/65* (2013.01); *G06Q 20/389* (2013.01);
(Continued)

(58) Field of Classification Search
CPC ..... H04L 63/0428; H04L 9/3239; H04L 9/50; G06F 8/65; G06F 16/2379; G06F 16/27;
(Continued)

(56) References Cited

U.S. PATENT DOCUMENTS 10,114,970 B2  10/2018  Goldfarb et al.
10,158,611 B2  12/2018  Castagna
(Continued)

FOREIGN PATENT DOCUMENTS

CN         105868027 A  *  8/2016

OTHER PUBLICATIONS

A. Kundu, Z. Sura and U. Sharma, "Collaborative and Accountable Hardware Governance Using Blockchain," 2018 IEEE 4th International Conference on Collaboration and Internet Computing (CIC), Philadelphia, PA, USA, 2018, pp. 114-121 (Year: 2018).*
(Continued)

*Primary Examiner* — Farid Homayounmehr
*Assistant Examiner* — Zhimei Zhu
(74) *Attorney, Agent, or Firm* — Compass IP Law PC

(57) ABSTRACT

Technologies for attesting a deployment of a workload using a blockchain includes a compute engine that receives a request from a remote device to validate one or more parameters of a managed node composed of one or more sleds. The compute engine retrieves a blockchain associated with the managed node. The blockchain includes one or more blocks, each block including information about the parameters of the managed node. The compute engine validates the blockchain and sends an indication that the blockchain is valid to the requesting device.

19 Claims, 25 Drawing Sheets

(51) Int. Cl.
  *G06Q 20/38* (2012.01)
  *G06F 16/23* (2019.01)
  *G06F 16/27* (2019.01)
  *G06F 21/64* (2013.01)
  *H04L 9/00* (2022.01)
  *H04L 9/32* (2006.01)

(52) U.S. Cl.
  CPC .......... *G06F 16/2379* (2019.01); *G06F 16/27* (2019.01); *G06F 21/64* (2013.01); *G06Q 2220/00* (2013.01); *H04L 9/3239* (2013.01); *H04L 9/50* (2022.05)

(58) Field of Classification Search
  CPC ........ G06F 21/64; G06F 9/505; G06F 9/5088; G06Q 20/389; G06Q 2220/00
  See application file for complete search history.

(56) References Cited

U.S. PATENT DOCUMENTS

| | | | |
|---|---|---|---|
| 10,261,711 | B1 | 4/2019 | Pasirstein |
| 10,275,739 | B2 | 4/2019 | Hanis et al. |
| 10,348,505 | B1 | 7/2019 | Crawforth et al. |
| 10,592,985 | B2 | 3/2020 | Ford et al. |
| 10,657,261 | B2 | 5/2020 | Kumar et al. |
| 2006/0031448 | A1 | 2/2006 | Chu et al. |
| 2013/0198797 | A1 | 8/2013 | Raghuram et al. |
| 2016/0283174 | A1 | 9/2016 | Feng et al. |
| 2017/0302663 | A1 | 10/2017 | Nainar et al. |
| 2017/0364552 | A1 | 12/2017 | Pattanaik et al. |
| 2017/0374768 | A1 | 12/2017 | Hughes et al. |
| 2018/0024578 | A1 | 1/2018 | Ahuja et al. |
| 2018/0115416 | A1 | 4/2018 | Diehl |
| 2018/0117446 | A1 | 5/2018 | Tran et al. |
| 2018/0117447 | A1 | 5/2018 | Tran et al. |
| 2018/0167198 | A1 | 6/2018 | Muller et al. |
| 2018/0240114 | A1 | 8/2018 | Li |
| 2018/0240129 | A1 | 8/2018 | Chuptys |
| 2018/0253464 | A1 | 9/2018 | Kohli et al. |
| 2018/0287949 | A1 | 10/2018 | Kumar et al. |
| 2018/0359269 | A1 | 12/2018 | Caceres et al. |
| 2019/0026450 | A1 | 1/2019 | Egner et al. |
| 2019/0190698 | A1* | 6/2019 | Nuzzi .................. H04L 9/3247 |
| 2019/0244241 | A1 | 8/2019 | Hain |
| 2019/0245699 | A1 | 8/2019 | Irwan et al. |
| 2019/0268277 | A1* | 8/2019 | Asthana ................. H04L 67/10 |
| 2019/0347658 | A1 | 11/2019 | Haimes et al. |
| 2019/0349426 | A1 | 11/2019 | Smith et al. |
| 2019/0356470 | A1 | 11/2019 | Deshpande et al. |
| 2019/0363938 | A1* | 11/2019 | Liebinger Portela ...................... H04L 41/0813 |
| 2019/0372834 | A1 | 12/2019 | Patil et al. |
| 2019/0394023 | A1 | 12/2019 | Menon et al. |
| 2020/0004855 | A1 | 1/2020 | Chepak, Jr. et al. |
| 2020/0005264 | A1 | 1/2020 | Patterson et al. |
| 2020/0005404 | A1 | 1/2020 | Patterson et al. |

OTHER PUBLICATIONS

Brambilla G et al: "Using Blockchain for Peer-lo-Peer Proof-of-Location," Retrieved from the Internet: URL:http://arxiv.org/abs/1607.00174 [retrieved on Nov. 12, 2019].

European First Office Action for Patent Application No. 19176592.4, Mailed Nov. 29, 2021, 5 pages. (EP Exam Report Article 94(3) EPC).

Extended European search report for European patent application No. 19176592.4, dated Nov. 22, 2019 (8 pages).

Final Office Action for U.S. Appl. No. 16/023,264, Mailed Dec. 23, 2020, 24 pages.

First Office Action for U.S. Appl. No. 16/023,264, Mailed Jun. 2, 2020, 23 pages.

Second Office Action for U.S. Appl. No. 16/023,264, Mailed May 19, 2021, 25 pages.

\* cited by examiner

TECHNOLOGIES FOR ATTESTING A DEPLOYED WORKLOAD USING BLOCKCHAIN

CLAIM OF PRIORITY

This application is a continuation of U.S. application Ser. No. 16/023,264, filed Jun. 29, 2018, entitled "TECHNOLOGIES FOR ATTESTING A DEPLOYED WORKLOAD USING BLOCKCHAIN," which is incorporated in its entirety herewith.

BACKGROUND

Cloud service providers may provide various services to a user, such as Software-as-a-Service (SaaS), Infrastructure-as-a-Service (IaaS), Platform-as-a-Service (PaaS), and the like. These services allow the user to deploy a workload on a server operated by the provider. Typically, a workload deployment is subject to agreed-upon terms between the user and the provider (e.g., Quality-of-Service (QoS) terms). Terms can include the types of services provided to the user and a level of service to provide to the user. Further, because of concerns with security and privacy laws in different countries, terms can also include a commitment to restrict execution and/or migration of the workload on servers that are physically located in a given country or set of countries.

In some cases, a cloud service provider may physically relocate a server on which a workload is executing or otherwise migrate the workload to a server in another geolocation. Because of such cases, a user may desire an audit trail of the workload and servers on which the workload is executing to ensure that the workload is executing on the previously-agreed upon system with the appropriate security attributes, firmware loads, geolocation, and the like. Typically, a data center may maintain records of what has occurred, but many modern record-keeping approaches can be vulnerable to tampering.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
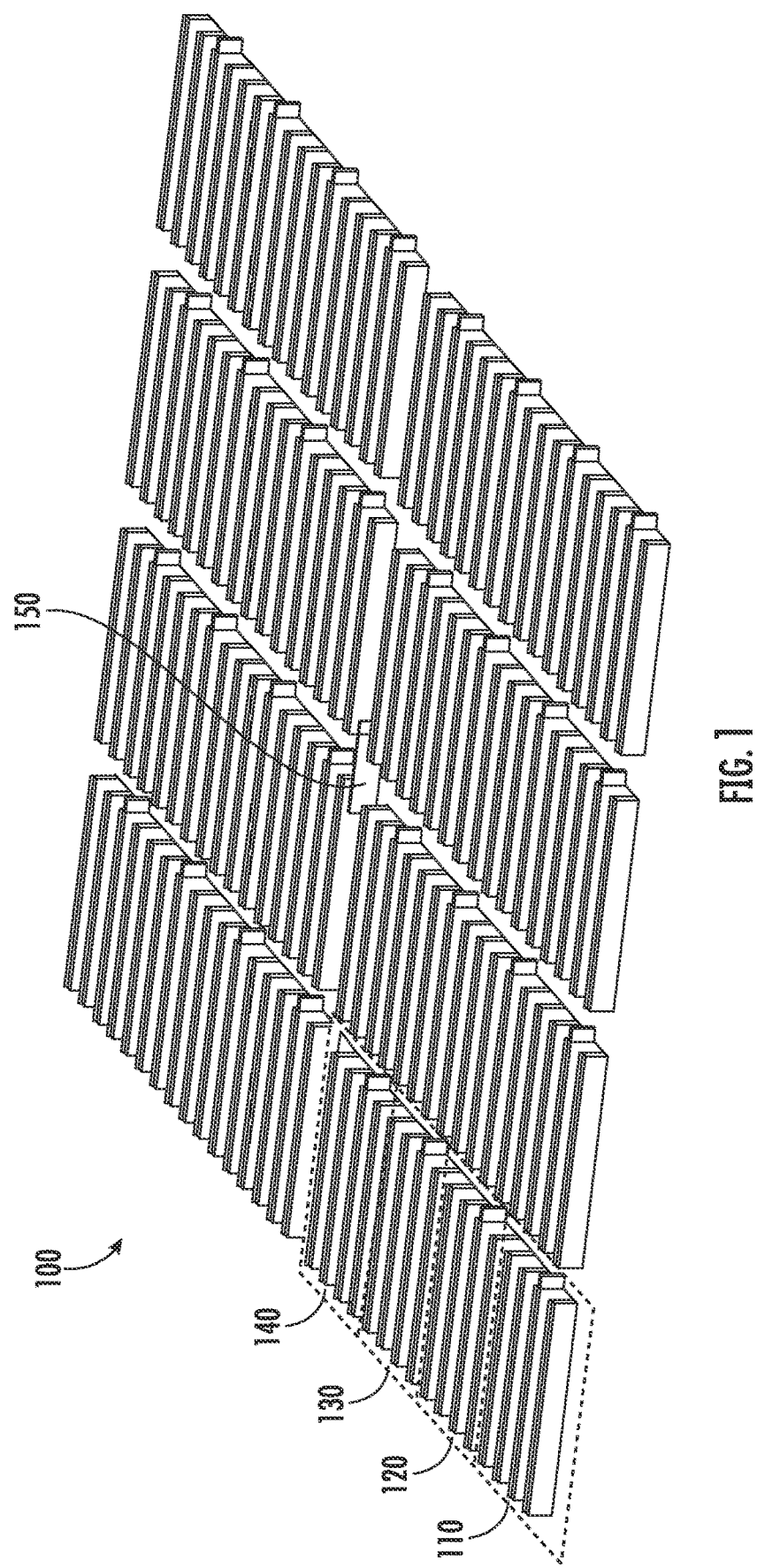
FIG. 1 is a simplified diagram of at least one embodiment of a data center for executing workloads with disaggregated resources.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a data center 100 in which disaggregated resources may cooperatively execute one or more workloads (e.g., applications on behalf of customers) includes multiple pods 110, 120, 130, 140, each of which includes one or more rows of racks. Of course, although data center 100 is shown with multiple pods, in some embodiments, the data center 100 may be embodied as a single pod. As described in more detail herein, each rack houses multiple sleds, each of which may be primarily equipped with a particular type of resource (e.g., memory devices, data storage devices, accelerator devices, general purpose processors), i.e., resources that can be logically coupled to form a composed node, which can act as, for example, a server. In the illustrative embodiment, the sleds in each pod 110, 120, 130, 140 are connected to multiple pod switches (e.g., switches that route data communications to and from sleds within the pod). The pod switches, in turn, connect with spine switches 150 that switch communications among pods (e.g., the pods 110, 120, 130, 140) in the data center 100. In some embodiments, the sleds may be connected with a fabric using Intel Omni-Path technology. In other embodiments, the sleds may be connected with other fabrics, such as InfiniBand or Ethernet. As described in more detail herein, resources within sleds in the data center 100 may be allocated to a group (referred to herein as a "managed node") containing resources from one or more sleds to be collectively utilized in the execution of a workload. The workload can execute as if the resources belonging to the managed node were located on the same sled. The resources in a managed node may belong to sleds belonging to different racks. As such, some resources of a single sled may be allocated to one managed node while other resources of the same sled are allocated to a different managed node (e.g., one processor assigned to one managed node and another processor of the same sled assigned to a different managed node).

A data center comprising disaggregated resources, such as data center 100, can be used in a wide variety of contexts, such as enterprise, government, cloud service provider, and communications service provider (e.g., Telco's), as well in a wide variety of sizes, from cloud service provider mega-data centers that consume over 100,000 sq. ft. to single- or multi-rack installations for use in base stations.

The disaggregation of resources to sleds comprised predominantly of a single type of resource (e.g., compute sleds comprising primarily compute resources, memory sleds containing primarily memory resources), and the selective allocation and deallocation of the disaggregated resources to form a managed node assigned to execute a workload improves the operation and resource usage of the data center 100 relative to typical data centers comprised of hyperconverged servers containing compute, memory, storage and perhaps additional resources in a single chassis. For example, because sleds predominantly contain resources of a particular type, resources of a given type can be upgraded independently of other resources. Additionally, because different resources types (processors, storage, accelerators, etc.) typically have different refresh rates, greater resource utilization and reduced total cost of ownership may be achieved. For example, a data center operator can upgrade the processors throughout their facility by only swapping out the compute sleds. In such a case, accelerator and storage resources may not be contemporaneously upgraded and, rather, may be allowed to continue operating until those resources are scheduled for their own refresh. Resource utilization may also increase. For example, if managed nodes are composed based on requirements of the workloads that will be running on them, resources within a node are more likely to be fully utilized. Such utilization may allow for more managed nodes to run in a data center with a given set of resources, or for a data center expected to run a given set of workloads, to be built using fewer resources.

Figure 2:
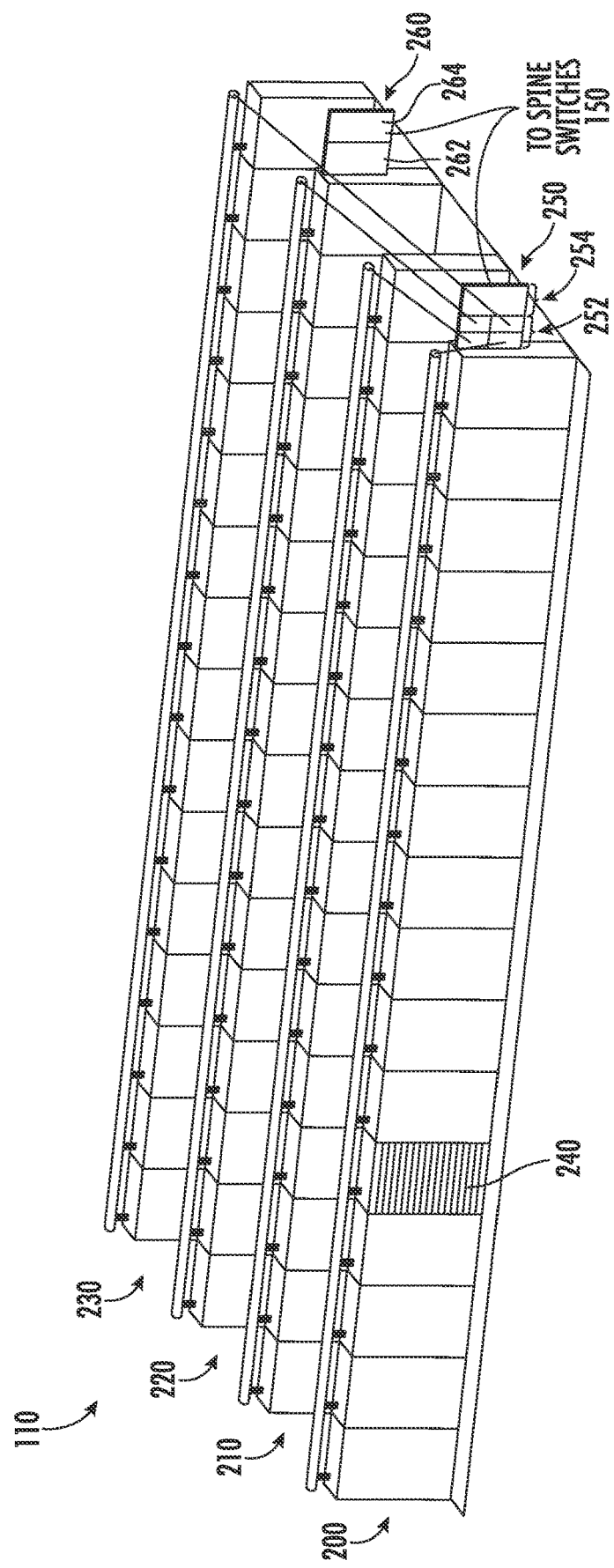
FIG. 2 is a simplified diagram of at least one embodiment of a pod that may be included in the data center of FIG. 1.

Referring now to FIG. 2, the pod 110, in the illustrative embodiment, includes a set of rows 200, 210, 220, 230 of racks 240. Each rack 240 may house multiple sleds (e.g., sixteen sleds) and provide power and data connections to the housed sleds, as described in more detail herein. In the illustrative embodiment, the racks in each row 200, 210, 220, 230 are connected to multiple pod switches 250, 260. The pod switch 250 includes a set of ports 252 to which the sleds of the racks of the pod 110 are connected and another set of ports 254 that connect the pod 110 to the spine switches 150 to provide connectivity to other pods in the data center 100. Similarly, the pod switch 260 includes a set of ports 262 to which the sleds of the racks of the pod 110 are connected and a set of ports 264 that connect the pod 110 to the spine switches 150. As such, the use of the pair of switches 250, 260 provides an amount of redundancy to the pod 110. For example, if either of the switches 250, 260 fails, the sleds in the pod 110 may still maintain data communication with the remainder of the data center 100 (e.g., sleds of other pods) through the other switch 250, 260. Furthermore, in the illustrative embodiment, the switches 150, 250, 260 may be embodied as dual-mode optical switches, capable of routing both Ethernet protocol communications carrying Internet Protocol (IP) packets and communications according to a second, high-performance link-layer protocol (e.g., Intel's Omni-Path Architecture's, InfiniBand, PCI Express) via optical signaling media of an optical fabric.

It should be appreciated that each of the other pods 120, 130, 140 (as well as any additional pods of the data center 100) may be similarly structured as, and have components similar to, the pod 110 shown in and described in regard to FIG. 2 (e.g., each pod may have rows of racks housing multiple sleds as described above). Additionally, while two pod switches 250, 260 are shown, it should be understood that in other embodiments, each pod 110, 120, 130, 140 may be connected to a different number of pod switches, providing even more failover capacity. Of course, in other embodiments, pods may be arranged differently than the rows-of-racks configuration shown in FIGS. 1-2. For example, a pod may be embodied as multiple sets of racks in which each set of racks is arranged radially, i.e., the racks are equidistant from a center switch.

Figure 3:
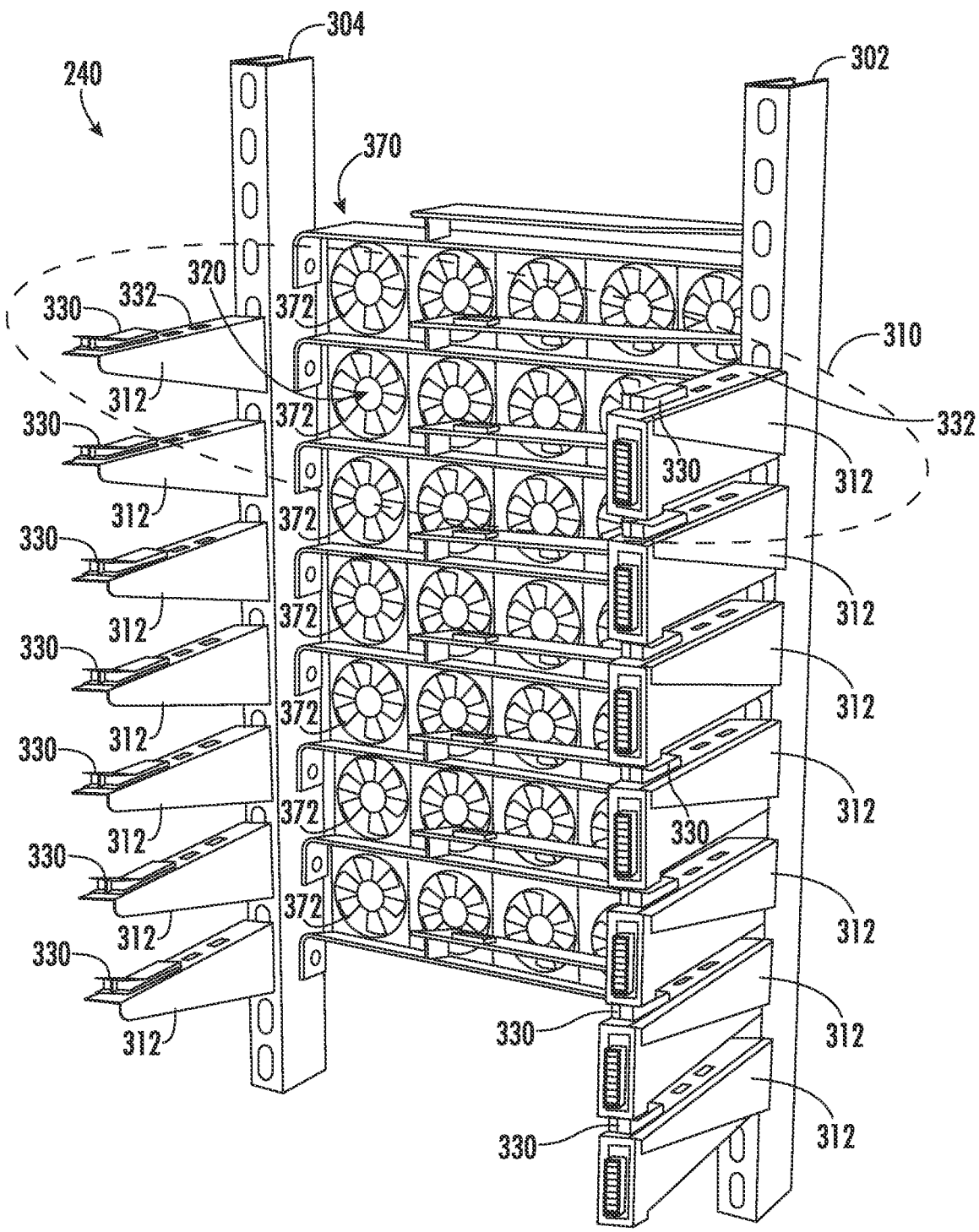
FIG. 3 is a perspective view of at least one embodiment of a rack that may be included in the pod of FIG. 2.
Figure 4:
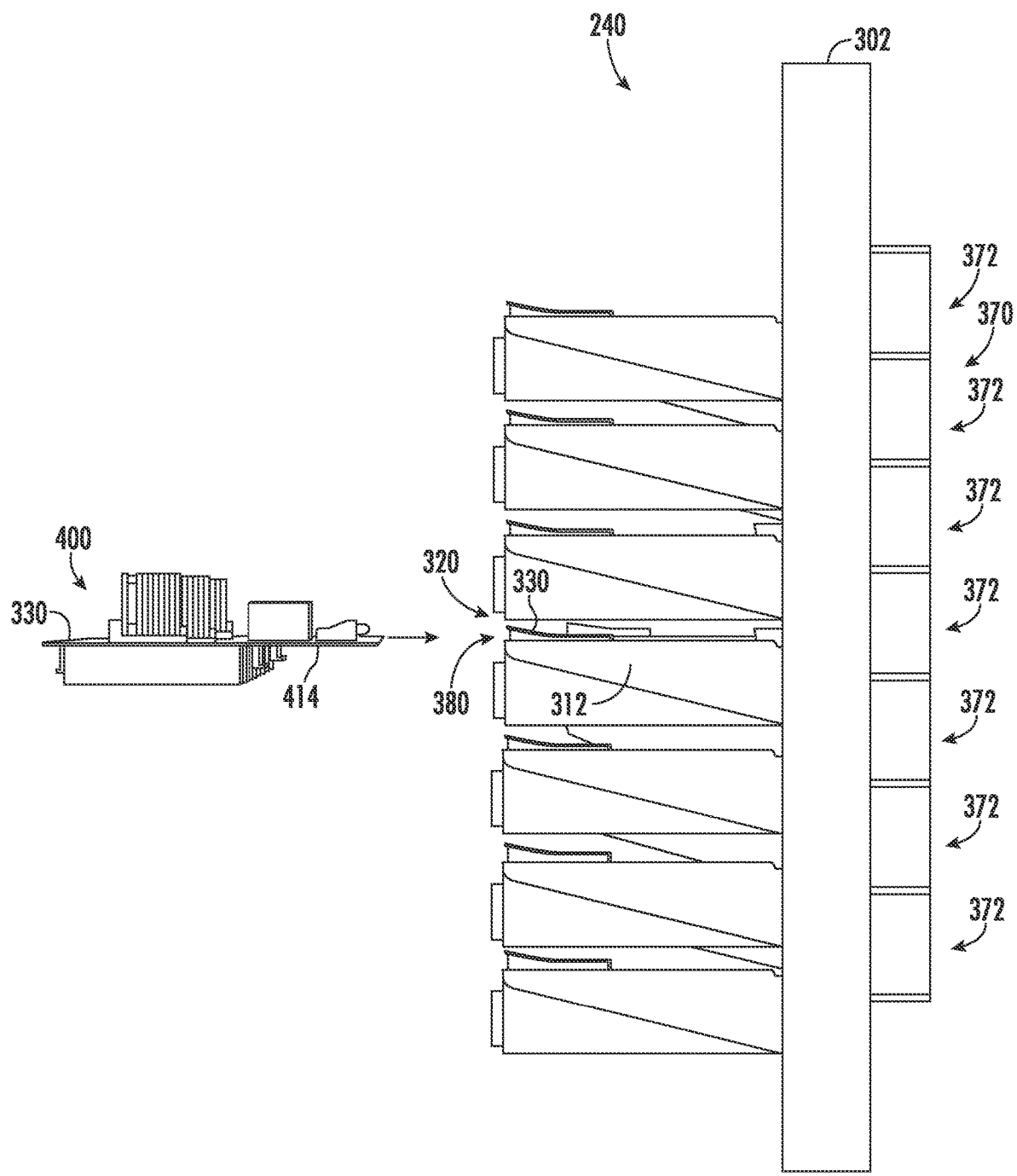
FIG. 4 is a side elevation view of the rack of FIG. 3.
Figure 5:
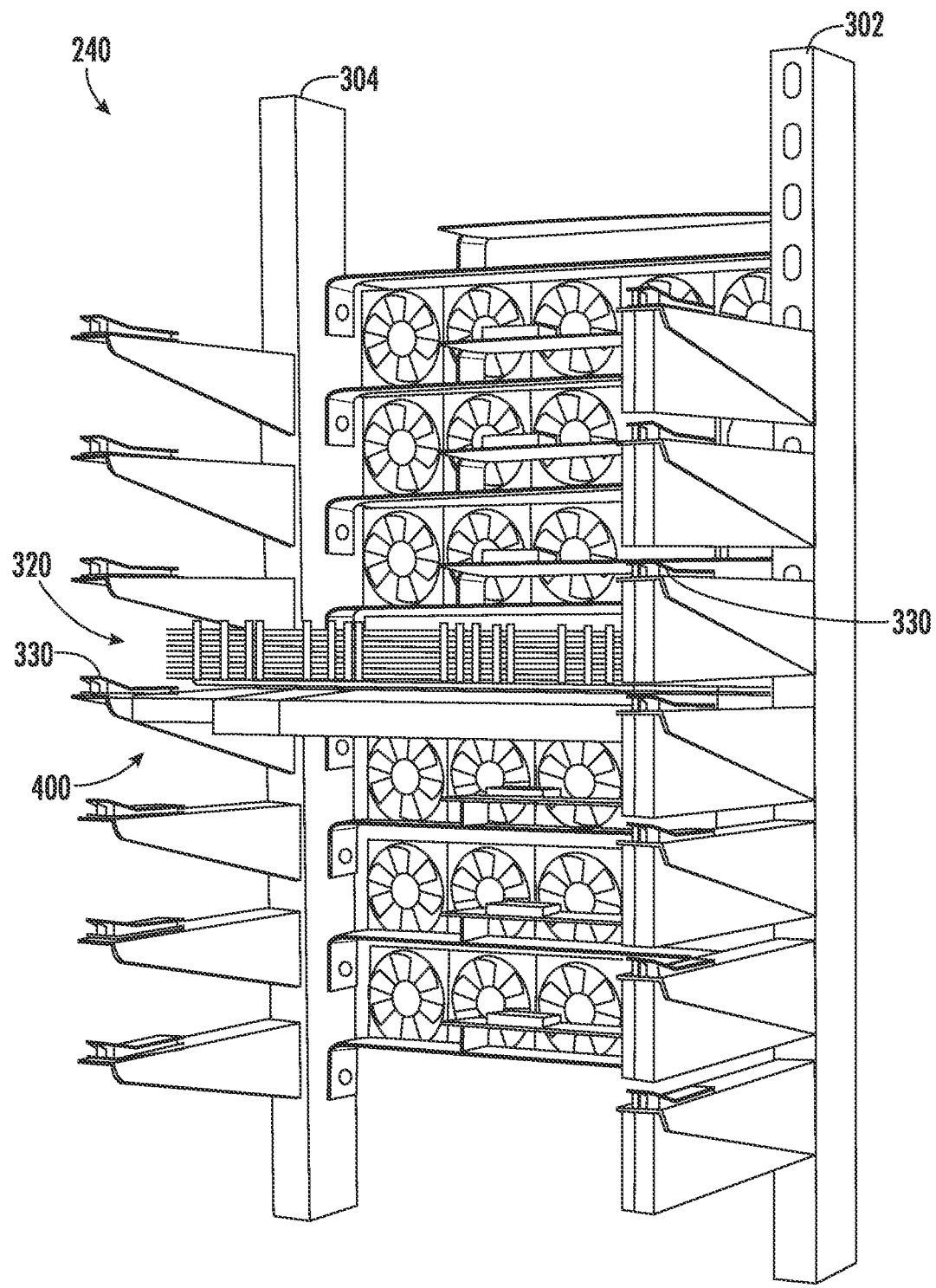
FIG. 5 is a perspective view of the rack of FIG. 3 having a sled mounted therein.

Referring now to FIGS. 3-5, each illustrative rack 240 of the data center 100 includes two elongated support posts 302, 304, which are arranged vertically. For example, the elongated support posts 302, 304 may extend upwardly from a floor of the data center 100 when deployed. The rack 240 also includes one or more horizontal pairs 310 of elongated support arms 312 (identified in FIG. 3 via a dashed ellipse) configured to support a sled of the data center 100 as discussed below. One elongated support arm 312 of the pair of elongated support arms 312 extends outwardly from the elongated support post 302 and the other elongated support arm 312 extends outwardly from the elongated support post 304.

In the illustrative embodiments, each sled of the data center 100 is embodied as a chassis-less sled. That is, each sled has a chassis-less circuit board substrate on which physical resources (e.g., processors, memory, accelerators, storage, etc.) are mounted as discussed in more detail below. As such, the rack 240 is configured to receive the chassis-less sleds. For example, each pair 310 of elongated support arms 312 defines a sled slot 320 of the rack 240, which is configured to receive a corresponding chassis-less sled. To do so, each illustrative elongated support arm 312 includes a circuit board guide 330 configured to receive the chassis-less circuit board substrate of the sled. Each circuit board guide 330 is secured to, or otherwise mounted to, a top side 332 of the corresponding elongated support arm 312. For example, in the illustrative embodiment, each circuit board guide 330 is mounted at a distal end of the corresponding elongated support arm 312 relative to the corresponding elongated support post 302, 304. For clarity of the Figures, not every circuit board guide 330 may be referenced in each Figure.

Each circuit board guide 330 includes an inner wall that defines a circuit board slot 380 configured to receive the chassis-less circuit board substrate of a sled 400 when the sled 400 is received in the corresponding sled slot 320 of the rack 240. To do so, as shown in FIG. 4, a user (or robot) aligns the chassis-less circuit board substrate of an illustrative chassis-less sled 400 to a sled slot 320. The user, or robot, may then slide the chassis-less circuit board substrate forward into the sled slot 320 such that each side edge 414 of the chassis-less circuit board substrate is received in a corresponding circuit board slot 380 of the circuit board guides 330 of the pair 310 of elongated support arms 312 that define the corresponding sled slot 320 as shown in FIG. 4. By having robotically accessible and robotically manipulable sleds comprising disaggregated resources, each type of resource can be upgraded independently of each other and at their own optimized refresh rate. Furthermore, the sleds are configured to blindly mate with power and data communication cables in each rack 240, enhancing their ability to be quickly removed, upgraded, reinstalled, and/or replaced. As such, in some embodiments, the data center 100 may operate (e.g., execute workloads, undergo maintenance and/or upgrades, etc.) without human involvement on the data center floor. In other embodiments, a human may facilitate one or more maintenance or upgrade operations in the data center 100.

It should be appreciated that each circuit board guide 330 is dual sided. That is, each circuit board guide 330 includes an inner wall that defines a circuit board slot 380 on each side of the circuit board guide 330. In this way, each circuit board guide 330 can support a chassis-less circuit board substrate on either side. As such, a single additional elongated support post may be added to the rack 240 to turn the rack 240 into a two-rack solution that can hold twice as many sled slots 320 as shown in FIG. 3. The illustrative rack 240 includes seven pairs 310 of elongated support arms 312 that define a corresponding seven sled slots 320, each configured to receive and support a corresponding sled 400 as discussed above. Of course, in other embodiments, the rack 240 may include additional or fewer pairs 310 of elongated support arms 312 (i.e., additional or fewer sled slots 320). It should be appreciated that because the sled 400 is chassis-less, the sled 400 may have an overall height that is different than typical servers. As such, in some embodiments, the height of each sled slot 320 may be shorter than the height of a typical server (e.g., shorter than a single rank unit, "1U"). That is, the vertical distance between each pair 310 of elongated support arms 312 may be less than a standard rack unit "1U." Additionally, due to the relative decrease in height of the sled slots 320, the overall height of the rack 240 in some embodiments may be shorter than the height of traditional rack enclosures. For example, in some embodiments, each of the elongated support posts 302, 304 may have a length of six feet or less. Again, in other embodiments, the rack 240 may have different dimensions. For example, in some embodiments, the vertical distance between each pair 310 of elongated support arms 312 may be greater than a standard rack unit "1U". In such embodiments, the increased vertical distance between the sleds allows for larger heat sinks to be attached to the physical resources and for larger fans to be used (e.g., in the fan array 370 described below) for cooling each sled, which in turn can allow the physical resources to operate at increased power levels. Further, it should be appreciated that the rack 240 does not include any walls, enclosures, or the like. Rather, the rack 240 is an enclosure-less rack that is opened to the local environment. Of course, in some cases, an end plate may be attached to one of the elongated support posts 302, 304 in those situations in which the rack 240 forms an end-of-row rack in the data center 100.

In some embodiments, various interconnects may be routed upwardly or downwardly through the elongated support posts 302, 304. To facilitate such routing, each elongated support post 302, 304 includes an inner wall that defines an inner chamber in which interconnects may be located. The interconnects routed through the elongated support posts 302, 304 may be embodied as any type of interconnects including, but not limited to, data or communication interconnects to provide communication connections to each sled slot 320, power interconnects to provide power to each sled slot 320, and/or other types of interconnects.

The rack 240, in the illustrative embodiment, includes a support platform on which a corresponding optical data connector (not shown) is mounted. Each optical data connector is associated with a corresponding sled slot 320 and is configured to mate with an optical data connector of a corresponding sled 400 when the sled 400 is received in the corresponding sled slot 320. In some embodiments, optical connections between components (e.g., sleds, racks, and switches) in the data center 100 are made with a blind mate optical connection. For example, a door on each cable may prevent dust from contaminating the fiber inside the cable. In the process of connecting to a blind mate optical connector mechanism, the door is pushed open when the end of the cable approaches or enters the connector mechanism. Subsequently, the optical fiber inside the cable may enter a gel within the connector mechanism and the optical fiber of one cable comes into contact with the optical fiber of another cable within the gel inside the connector mechanism.

The illustrative rack 240 also includes a fan array 370 coupled to the cross-support arms of the rack 240. The fan array 370 includes one or more rows of cooling fans 372, which are aligned in a horizontal line between the elongated support posts 302, 304. In the illustrative embodiment, the fan array 370 includes a row of cooling fans 372 for each sled slot 320 of the rack 240. As discussed above, each sled 400 does not include any on-board cooling system in the illustrative embodiment and, as such, the fan array 370 provides cooling for each sled 400 received in the rack 240. Each rack 240, in the illustrative embodiment, also includes a power supply associated with each sled slot 320. Each power supply is secured to one of the elongated support arms 312 of the pair 310 of elongated support arms 312 that define the corresponding sled slot 320. For example, the rack 240 may include a power supply coupled or secured to each elongated support arm 312 extending from the elongated support post 302. Each power supply includes a power connector configured to mate with a power connector of the sled 400 when the sled 400 is received in the corresponding sled slot 320. In the illustrative embodiment, the sled 400 does not include any on-board power supply and, as such, the power supplies provided in the rack 240 supply power to corresponding sleds 400 when mounted to the rack 240. Each power supply is configured to satisfy the power requirements for its associated sled, which can vary from sled to sled. Additionally, the power supplies provided in the rack 240 can operate independent of each other. That is, within a single rack, a first power supply providing power to a compute sled can provide power levels that are different than power levels supplied by a second power supply providing power to an accelerator sled. The power supplies may be controllable at the sled level or rack level, and may be controlled locally by components on the associated sled or remotely, such as by another sled or an orchestrator.

Figure 6:
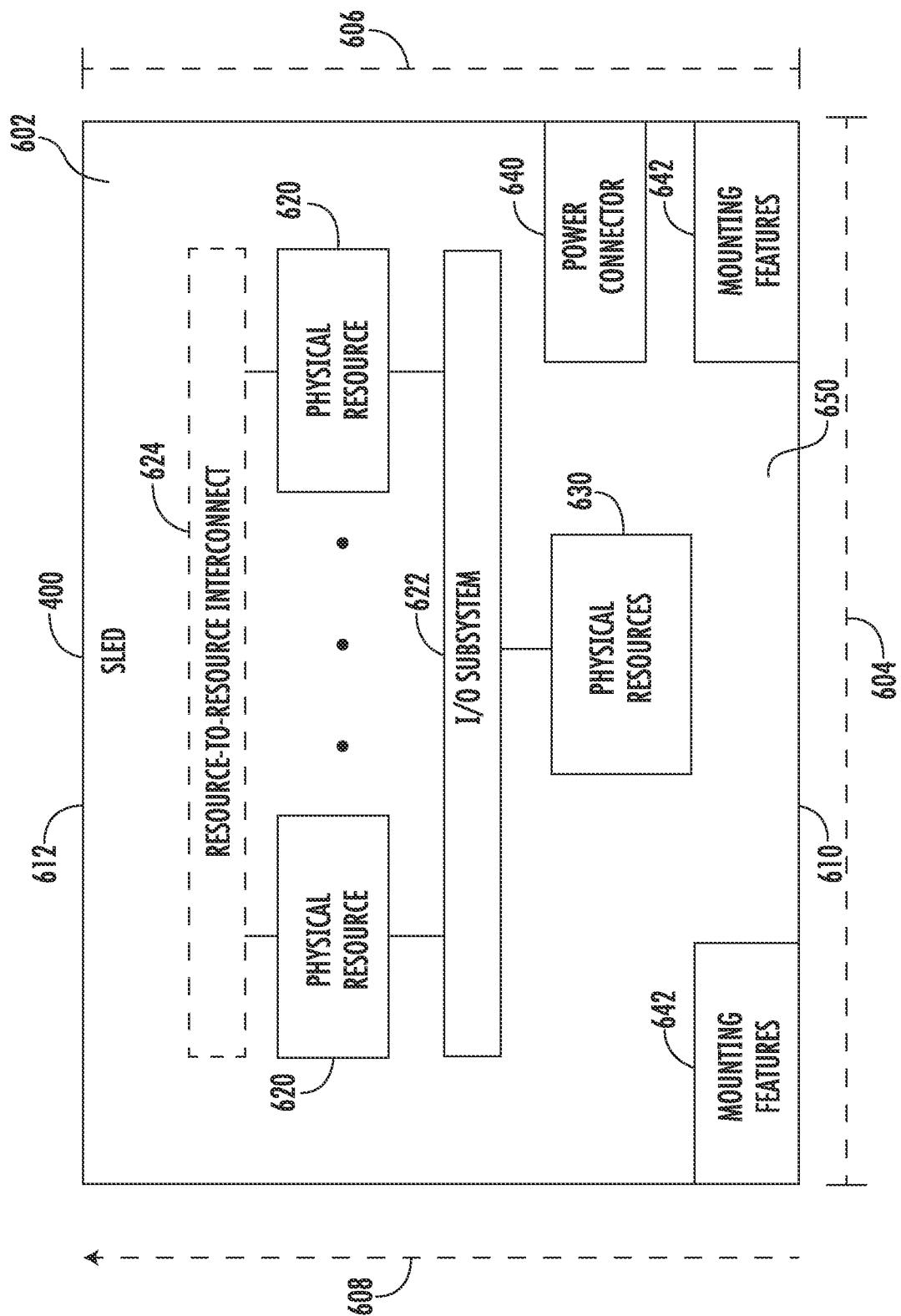
FIG. 6 is a is a simplified block diagram of at least one embodiment of a top side of the sled of FIG. 5.

Referring now to FIG. 6, the sled 400, in the illustrative embodiment, is configured to be mounted in a corresponding rack 240 of the data center 100 as discussed above. In some embodiments, each sled 400 may be optimized or otherwise configured for performing particular tasks, such as compute tasks, acceleration tasks, data storage tasks, etc. For example, the sled 400 may be embodied as a compute sled 800 as discussed below in regard to FIGS. 8-9, an accelerator sled 1000 as discussed below in regard to FIGS. 10-11, a storage sled 1200 as discussed below in regard to FIGS. 12-13, or as a sled optimized or otherwise configured to perform other specialized tasks, such as a memory sled 1400, discussed below in regard to FIG. 14.

As discussed above, the illustrative sled 400 includes a chassis-less circuit board substrate 602, which supports various physical resources (e.g., electrical components) mounted thereon. It should be appreciated that the circuit board substrate 602 is "chassis-less" in that the sled 400 does not include a housing or enclosure. Rather, the chassis-less circuit board substrate 602 is open to the local environment. The chassis-less circuit board substrate 602 may be formed from any material capable of supporting the various electrical components mounted thereon. For example, in an illustrative embodiment, the chassis-less circuit board substrate 602 is formed from an FR-4 glass-reinforced epoxy laminate material. Of course, other materials may be used to form the chassis-less circuit board substrate 602 in other embodiments.

As discussed in more detail below, the chassis-less circuit board substrate 602 includes multiple features that improve the thermal cooling characteristics of the various electrical components mounted on the chassis-less circuit board substrate 602. As discussed, the chassis-less circuit board substrate 602 does not include a housing or enclosure, which may improve the airflow over the electrical components of the sled 400 by reducing those structures that may inhibit air flow. For example, because the chassis-less circuit board substrate 602 is not positioned in an individual housing or enclosure, there is no vertically-arranged backplane (e.g., a backplate of the chassis) attached to the chassis-less circuit board substrate 602, which could inhibit air flow across the electrical components. Additionally, the chassis-less circuit board substrate 602 has a geometric shape configured to reduce the length of the airflow path across the electrical components mounted to the chassis-less circuit board substrate 602. For example, the illustrative chassis-less circuit board substrate 602 has a width 604 that is greater than a depth 606 of the chassis-less circuit board substrate 602. In one particular embodiment, for example, the chassis-less circuit board substrate 602 has a width of about 21 inches and a depth of about 9 inches, compared to a typical server that has a width of about 17 inches and a depth of about 39 inches. As such, an airflow path 608 that extends from a front edge 610 of the chassis-less circuit board substrate 602 toward a rear edge 612 has a shorter distance relative to typical servers, which may improve the thermal cooling characteristics of the sled 400. Furthermore, although not illustrated in FIG. 6, the various physical resources mounted to the chassis-less circuit board substrate 602 are mounted in corresponding locations such that no two substantively heat-producing electrical components shadow each other as discussed in more detail below. That is, no two electrical components, which produce appreciable heat during operation (i.e., greater than a nominal heat sufficient enough to adversely impact the cooling of another electrical component), are mounted to the chassis-less circuit board substrate 602 linearly in-line with each other along the direction of the airflow path 608 (i.e., along a direction extending from the front edge 610 toward the rear edge 612 of the chassis-less circuit board substrate 602).

As discussed above, the illustrative sled 400 includes one or more physical resources 620 mounted to a top side 650 of the chassis-less circuit board substrate 602. Although two physical resources 620 are shown in FIG. 6, it should be appreciated that the sled 400 may include one, two, or more physical resources 620 in other embodiments. The physical resources 620 may be embodied as any type of processor, controller, or other compute circuit capable of performing various tasks such as compute functions and/or controlling the functions of the sled 400 depending on, for example, the type or intended functionality of the sled 400. For example, as discussed in more detail below, the physical resources 620 may be embodied as high-performance processors in embodiments in which the sled 400 is embodied as a compute sled, as accelerator co-processors or circuits in embodiments in which the sled 400 is embodied as an accelerator sled, storage controllers in embodiments in which the sled 400 is embodied as a storage sled, or a set of memory devices in embodiments in which the sled 400 is embodied as a memory sled.

The sled 400 also includes one or more additional physical resources 630 mounted to the top side 650 of the chassis-less circuit board substrate 602. In the illustrative embodiment, the additional physical resources include a network interface controller (NIC) as discussed in more detail below. Of course, depending on the type and functionality of the sled 400, the physical resources 630 may include additional or other electrical components, circuits, and/or devices in other embodiments.

The physical resources 620 are communicatively coupled to the physical resources 630 via an input/output (I/O) subsystem 622. The I/O subsystem 622 may be embodied as circuitry and/or components to facilitate input/output operations with the physical resources 620, the physical resources 630, and/or other components of the sled 400. For example, the I/O subsystem 622 may be embodied as, or otherwise include, memory controller hubs, input/output control hubs, integrated sensor hubs, firmware devices, communication links (e.g., point-to-point links, bus links, wires, cables, waveguides, light guides, printed circuit board traces, etc.), and/or other components and subsystems to facilitate the input/output operations. In the illustrative embodiment, the I/O subsystem 622 is embodied as, or otherwise includes, a double data rate 4 (DDR4) data bus or a DDR5 data bus.

In some embodiments, the sled 400 may also include a resource-to-resource interconnect 624. The resource-to-resource interconnect 624 may be embodied as any type of communication interconnect capable of facilitating resource-to-resource communications. In the illustrative embodiment, the resource-to-resource interconnect 624 is embodied as a high-speed point-to-point interconnect (e.g., faster than the I/O subsystem 622). For example, the resource-to-resource interconnect 624 may be embodied as a QuickPath Interconnect (QPI), an UltraPath Interconnect (UPI), or other high-speed point-to-point interconnect dedicated to resource-to-resource communications.

The sled 400 also includes a power connector 640 configured to mate with a corresponding power connector of the rack 240 when the sled 400 is mounted in the corresponding rack 240. The sled 400 receives power from a power supply of the rack 240 via the power connector 640 to supply power to the various electrical components of the sled 400. That is, the sled 400 does not include any local power supply (i.e., an on-board power supply) to provide power to the electrical components of the sled 400. The exclusion of a local or on-board power supply facilitates the reduction in the overall footprint of the chassis-less circuit board substrate 602, which may increase the thermal cooling characteristics of the various electrical components mounted on the chassis-less circuit board substrate 602 as discussed above. In some embodiments, voltage regulators are placed on a bottom side 750 (see FIG. 7) of the chassis-less circuit board substrate 602 directly opposite of the processors 820 (see FIG. 8), and power is routed from the voltage regulators to the processors 820 by vias extending through the circuit board substrate 602. Such a configuration provides an increased thermal budget, additional current and/or voltage, and better voltage control relative to typical printed circuit boards in which processor power is delivered from a voltage regulator, in part, by printed circuit traces.

In some embodiments, the sled 400 may also include mounting features 642 configured to mate with a mounting arm, or other structure, of a robot to facilitate the placement of the sled 600 in a rack 240 by the robot. The mounting features 642 may be embodied as any type of physical structures that allow the robot to grasp the sled 400 without damaging the chassis-less circuit board substrate 602 or the electrical components mounted thereto. For example, in some embodiments, the mounting features 642 may be embodied as non-conductive pads attached to the chassis-less circuit board substrate 602. In other embodiments, the mounting features may be embodied as brackets, braces, or other similar structures attached to the chassis-less circuit board substrate 602. The particular number, shape, size, and/or make-up of the mounting feature 642 may depend on the design of the robot configured to manage the sled 400.

Figure 7:
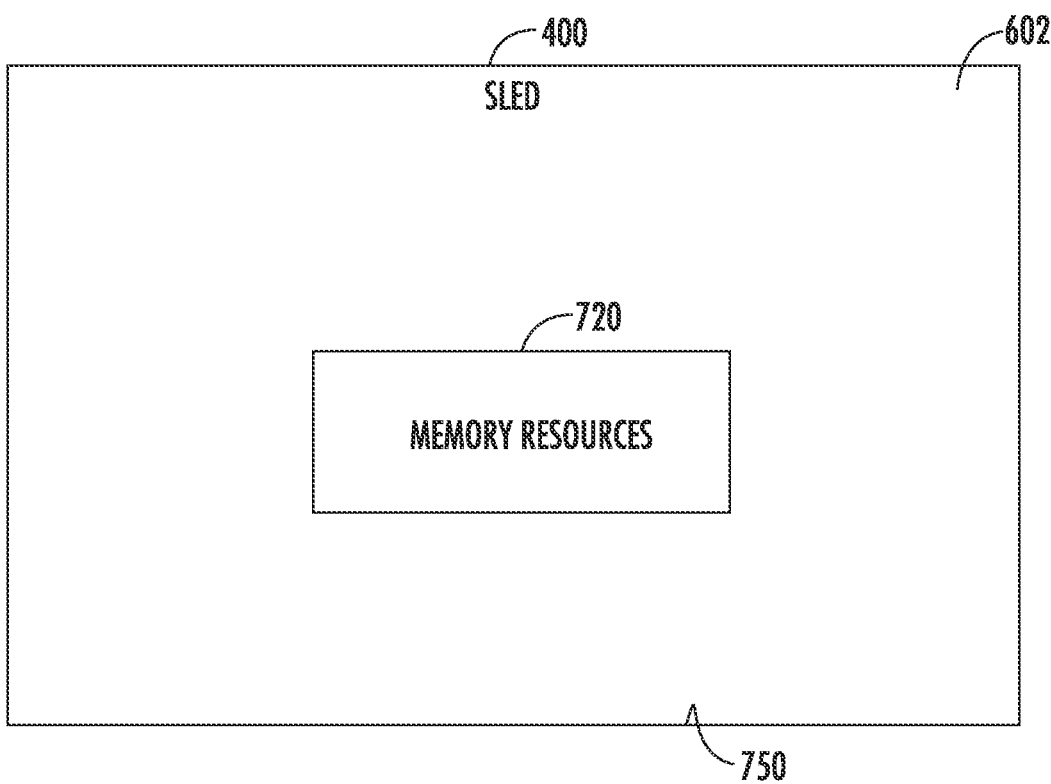
FIG. 7 is a simplified block diagram of at least one embodiment of a bottom side of the sled of FIG. 6.

Referring now to FIG. 7, in addition to the physical resources 630 mounted on the top side 650 of the chassis-less circuit board substrate 602, the sled 400 also includes one or more memory devices 720 mounted to a bottom side 750 of the chassis-less circuit board substrate 602. That is, the chassis-less circuit board substrate 602 is embodied as a double-sided circuit board. The physical resources 620 are communicatively coupled to the memory devices 720 via the I/O subsystem 622. For example, the physical resources 620 and the memory devices 720 may be communicatively coupled by one or more vias extending through the chassis-less circuit board substrate 602. Each physical resource 620 may be communicatively coupled to a different set of one or more memory devices 720 in some embodiments. Alternatively, in other embodiments, each physical resource 620 may be communicatively coupled to each memory device 720.

The memory devices 720 may be embodied as any type of memory device capable of storing data for the physical resources 620 during operation of the sled 400, such as any type of volatile (e.g., dynamic random access memory (DRAM), etc.) or non-volatile memory. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include next-generation nonvolatile devices, such as Intel 3D XPoint™ memory or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In some embodiments, the memory device may comprise a transistor-less stackable cross point architecture in which memory cells sit at the intersection of word lines and bit lines and are individually addressable and in which bit storage is based on a change in bulk resistance.

Figure 8:
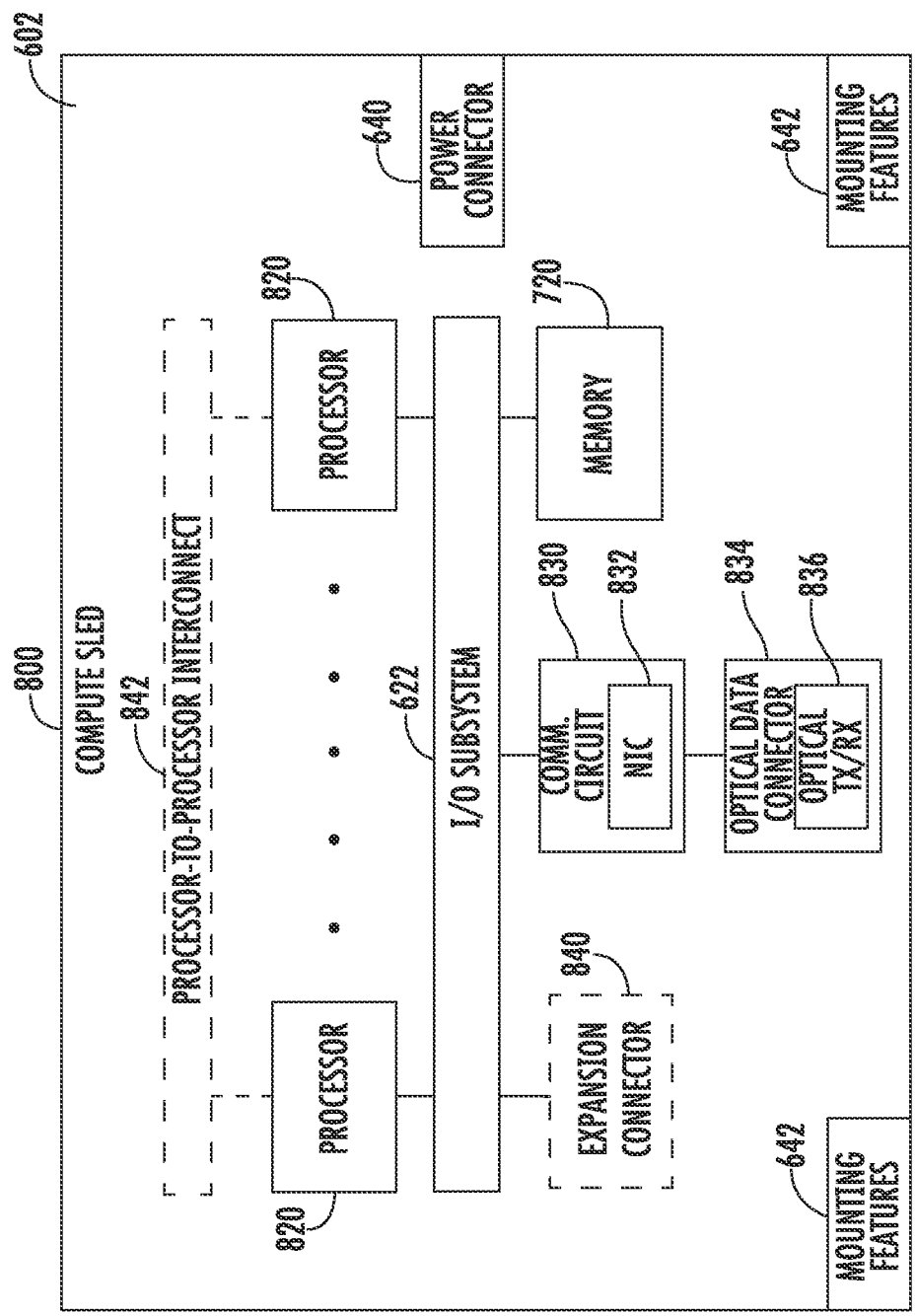
FIG. 8 is a simplified block diagram of at least one embodiment of a compute sled usable in the data center of FIG. 1.

Referring now to FIG. 8, in some embodiments, the sled 400 may be embodied as a compute sled 800. The compute sled 800 is optimized, or otherwise configured, to perform compute tasks. Of course, as discussed above, the compute sled 800 may rely on other sleds, such as acceleration sleds and/or storage sleds, to perform such compute tasks. The compute sled 800 includes various physical resources (e.g., electrical components) similar to the physical resources of the sled 400, which have been identified in FIG. 8 using the same reference numbers. The description of such components provided above in regard to FIGS. 6 and 7 applies to the corresponding components of the compute sled 800 and is not repeated herein for clarity of the description of the compute sled 800.

In the illustrative compute sled 800, the physical resources 620 are embodied as processors 820. Although only two processors 820 are shown in FIG. 8, it should be appreciated that the compute sled 800 may include additional processors 820 in other embodiments. Illustratively, the processors 820 are embodied as high-performance processors 820 and may be configured to operate at a relatively high power rating. Although the processors 820 generate additional heat operating at power ratings greater than typical processors (which operate at around 155-230 W), the enhanced thermal cooling characteristics of the chassis-less circuit board substrate 602 discussed above facilitate the higher power operation. For example, in the illustrative embodiment, the processors 820 are configured to operate at a power rating of at least 250 W. In some embodiments, the processors 820 may be configured to operate at a power rating of at least 350 W.

In some embodiments, the compute sled 800 may also include a processor-to-processor interconnect 842. Similar to the resource-to-resource interconnect 624 of the sled 400 discussed above, the processor-to-processor interconnect 842 may be embodied as any type of communication interconnect capable of facilitating processor-to-processor interconnect 842 communications. In the illustrative embodiment, the processor-to-processor interconnect 842 is embodied as a high-speed point-to-point interconnect (e.g., faster than the I/O subsystem 622). For example, the processor-to-processor interconnect 842 may be embodied as a QuickPath Interconnect (QPI), an UltraPath Interconnect (UPI), or other high-speed point-to-point interconnect dedicated to processor-to-processor communications.

The compute sled 800 also includes a communication circuit 830. The illustrative communication circuit 830 includes a network interface controller (NIC) 832, which may also be referred to as a host fabric interface (HFI). The NIC 832 may be embodied as, or otherwise include, any type of integrated circuit, discrete circuits, controller chips, chipsets, add-in-boards, daughtercards, network interface cards, or other devices that may be used by the compute sled 800 to connect with another compute device (e.g., with other sleds 400). In some embodiments, the NIC 832 may be embodied as part of a system-on-a-chip (SoC) that includes one or more processors, or included on a multichip package that also contains one or more processors. In some embodiments, the NIC 832 may include a local processor (not shown) and/or a local memory (not shown) that are both local to the NIC 832. In such embodiments, the local processor of the NIC 832 may be capable of performing one or more of the functions of the processors 820. Additionally or alternatively, in such embodiments, the local memory of the NIC 832 may be integrated into one or more components of the compute sled at the board level, socket level, chip level, and/or other levels.

The communication circuit 830 is communicatively coupled to an optical data connector 834. The optical data connector 834 is configured to mate with a corresponding optical data connector of the rack 240 when the compute sled 800 is mounted in the rack 240. Illustratively, the optical data connector 834 includes a plurality of optical fibers which lead from a mating surface of the optical data connector 834 to an optical transceiver 836. The optical transceiver 836 is configured to convert incoming optical signals from the rack-side optical data connector to electrical signals and to convert electrical signals to outgoing optical signals to the rack-side optical data connector. Although shown as forming part of the optical data connector 834 in the illustrative embodiment, the optical transceiver 836 may form a portion of the communication circuit 830 in other embodiments.

In some embodiments, the compute sled 800 may also include an expansion connector 840. In such embodiments, the expansion connector 840 is configured to mate with a corresponding connector of an expansion chassis-less circuit board substrate to provide additional physical resources to the compute sled 800. The additional physical resources may be used, for example, by the processors 820 during operation of the compute sled 800. The expansion chassis-less circuit board substrate may be substantially similar to the chassis-less circuit board substrate 602 discussed above and may include various electrical components mounted thereto. The particular electrical components mounted to the expansion chassis-less circuit board substrate may depend on the intended functionality of the expansion chassis-less circuit board substrate. For example, the expansion chassis-less circuit board substrate may provide additional compute resources, memory resources, and/or storage resources. As such, the additional physical resources of the expansion chassis-less circuit board substrate may include, but is not limited to, processors, memory devices, storage devices, and/or accelerator circuits including, for example, field programmable gate arrays (FPGA), application-specific integrated circuits (ASICs), security co-processors, graphics processing units (GPUs), machine learning circuits, or other specialized processors, controllers, devices, and/or circuits.

Figure 9:
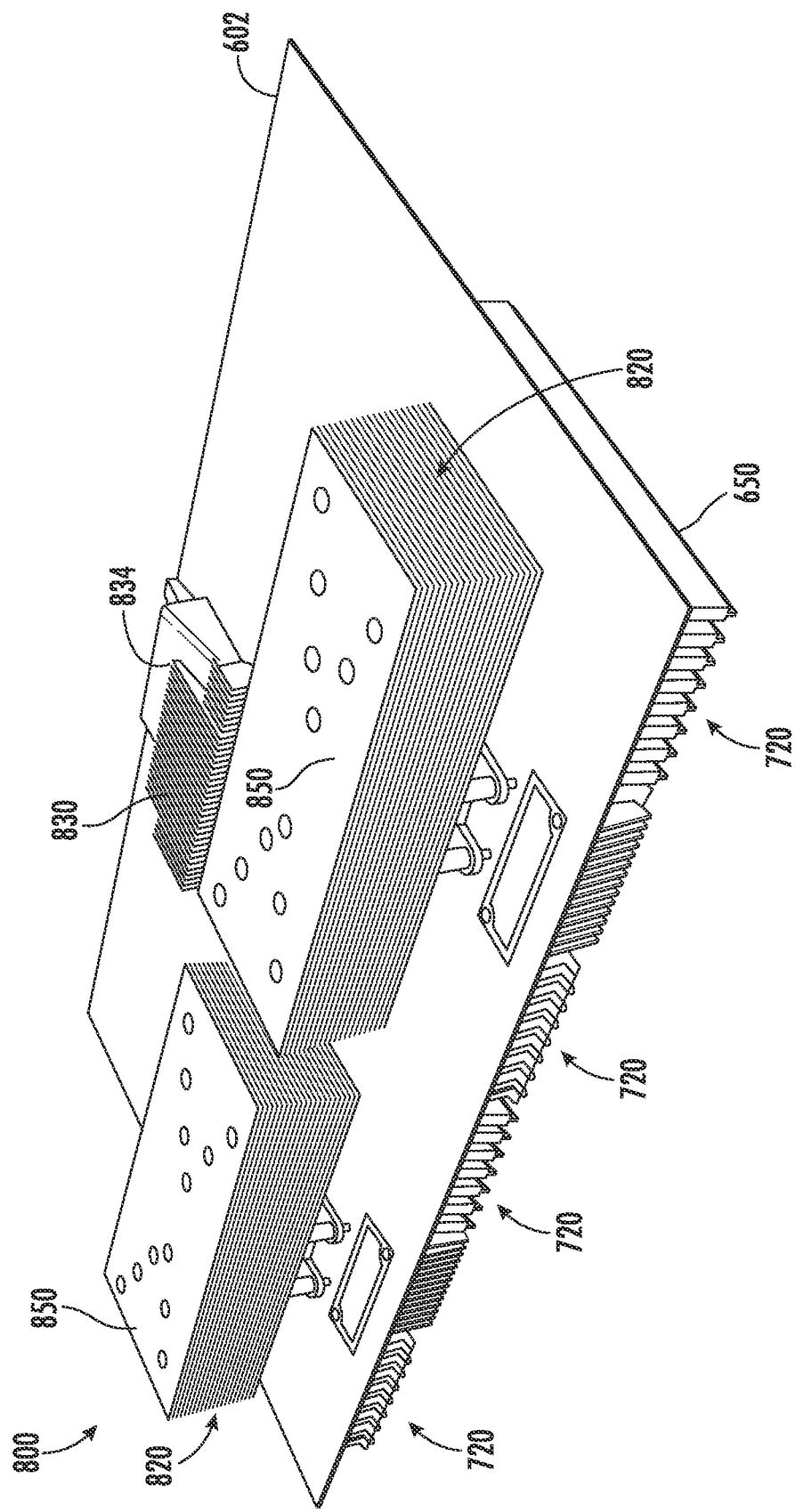
FIG. 9 is a top perspective view of at least one embodiment of the compute sled of FIG. 8.

Referring now to FIG. 9, an illustrative embodiment of the compute sled 800 is shown. As shown, the processors 820, communication circuit 830, and optical data connector 834 are mounted to the top side 650 of the chassis-less circuit board substrate 602. Any suitable attachment or mounting technology may be used to mount the physical resources of the compute sled 800 to the chassis-less circuit board substrate 602. For example, the various physical resources may be mounted in corresponding sockets (e.g., a processor socket), holders, or brackets. In some cases, some of the electrical components may be directly mounted to the chassis-less circuit board substrate 602 via soldering or similar techniques.

As discussed above, the individual processors 820 and communication circuit 830 are mounted to the top side 650 of the chassis-less circuit board substrate 602 such that no two heat-producing, electrical components shadow each other. In the illustrative embodiment, the processors 820 and communication circuit 830 are mounted in corresponding locations on the top side 650 of the chassis-less circuit board substrate 602 such that no two of those physical resources are linearly in-line with others along the direction of the airflow path 608. It should be appreciated that, although the optical data connector 834 is in-line with the communication circuit 830, the optical data connector 834 produces no or nominal heat during operation.

The memory devices 720 of the compute sled 800 are mounted to the bottom side 750 of the of the chassis-less circuit board substrate 602 as discussed above in regard to the sled 400. Although mounted to the bottom side 750, the memory devices 720 are communicatively coupled to the processors 820 located on the top side 650 via the I/O subsystem 622. Because the chassis-less circuit board substrate 602 is embodied as a double-sided circuit board, the memory devices 720 and the processors 820 may be communicatively coupled by one or more vias, connectors, or other mechanisms extending through the chassis-less circuit board substrate 602. Of course, each processor 820 may be communicatively coupled to a different set of one or more memory devices 720 in some embodiments. Alternatively, in other embodiments, each processor 820 may be communicatively coupled to each memory device 720. In some embodiments, the memory devices 720 may be mounted to one or more memory mezzanines on the bottom side of the chassis-less circuit board substrate 602 and may interconnect with a corresponding processor 820 through a ball-grid array.

Each of the processors 820 includes a heatsink 850 secured thereto. Due to the mounting of the memory devices 720 to the bottom side 750 of the chassis-less circuit board substrate 602 (as well as the vertical spacing of the sleds 400 in the corresponding rack 240), the top side 650 of the chassis-less circuit board substrate 602 includes additional "free" area or space that facilitates the use of heatsinks 850 having a larger size relative to traditional heatsinks used in typical servers. Additionally, due to the improved thermal cooling characteristics of the chassis-less circuit board substrate 602, none of the processor heatsinks 850 include cooling fans attached thereto. That is, each of the heatsinks 850 is embodied as a fan-less heatsink. In some embodiments, the heat sinks 850 mounted atop the processors 820 may overlap with the heat sink attached to the communication circuit 830 in the direction of the airflow path 608 due to their increased size, as illustratively suggested by FIG. 9.

Figure 10:
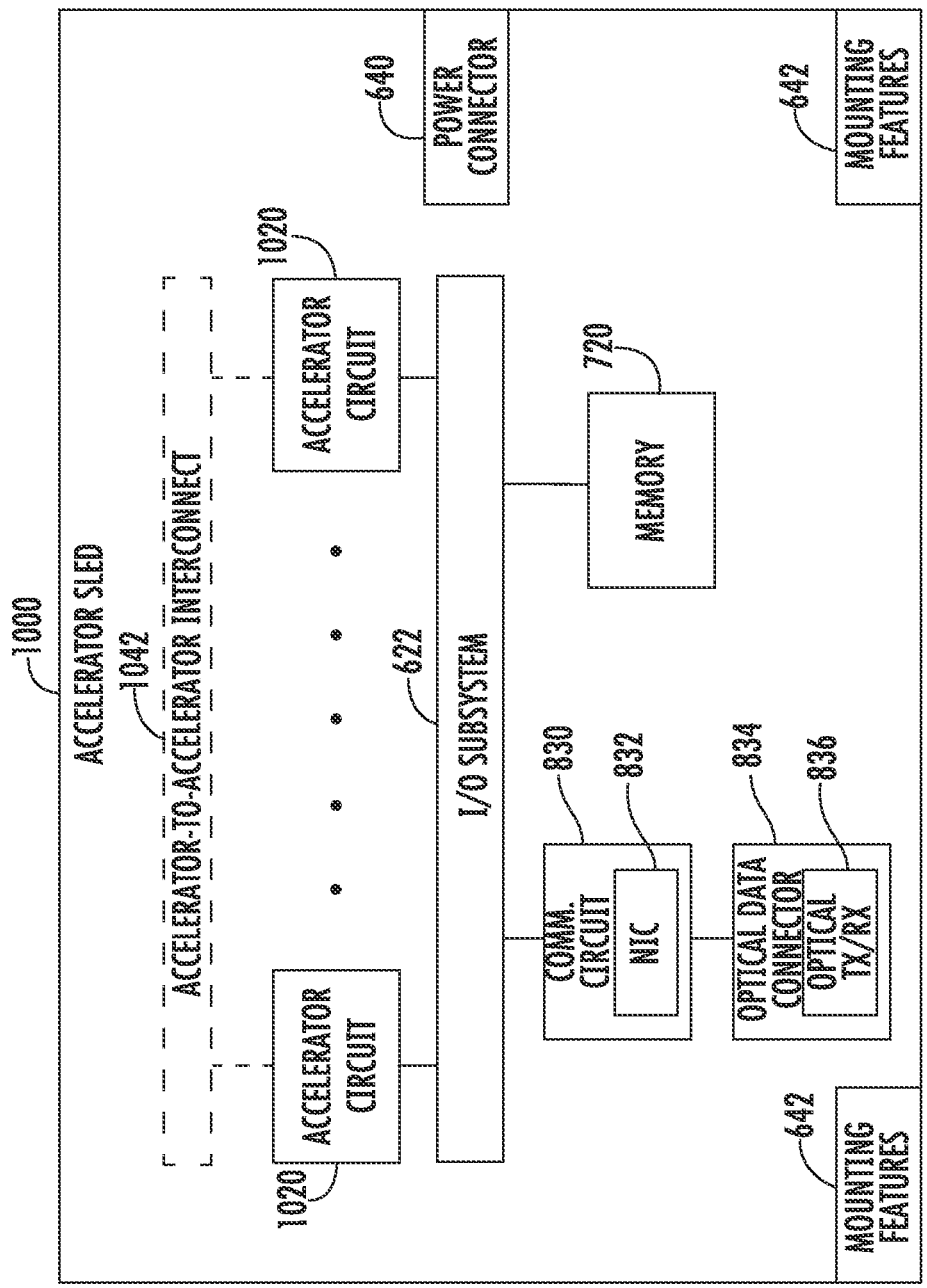
FIG. 10 is a simplified block diagram of at least one embodiment of an accelerator sled usable in the data center of FIG. 1.

Referring now to FIG. 10, in some embodiments, the sled 400 may be embodied as an accelerator sled 1000. The accelerator sled 1000 is configured, to perform specialized compute tasks, such as machine learning, encryption, hashing, or other computational-intensive task. In some embodiments, for example, a compute sled 800 may offload tasks to the accelerator sled 1000 during operation. The accelerator sled 1000 includes various components similar to components of the sled 400 and/or compute sled 800, which have been identified in FIG. 10 using the same reference numbers. The description of such components provided above in regard to FIGS. 6, 7, and 8 apply to the corresponding components of the accelerator sled 1000 and is not repeated herein for clarity of the description of the accelerator sled 1000.

Figure 11:
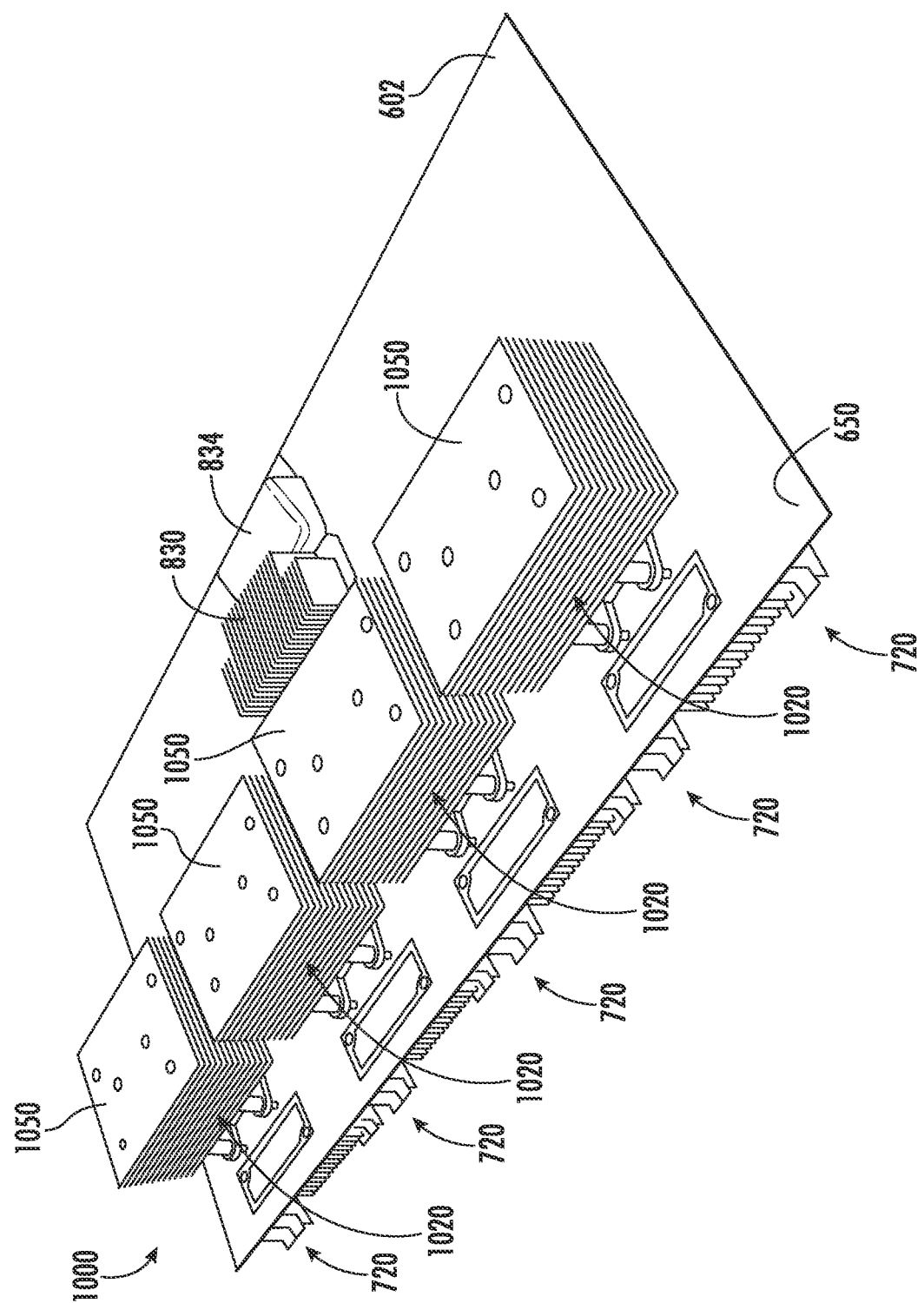
FIG. 11 is a top perspective view of at least one embodiment of the accelerator sled of FIG. 10.

In the illustrative accelerator sled 1000, the physical resources 620 are embodied as accelerator circuits 1020. Although only two accelerator circuits 1020 are shown in FIG. 10, it should be appreciated that the accelerator sled 1000 may include additional accelerator circuits 1020 in other embodiments. For example, as shown in FIG. 11, the accelerator sled 1000 may include four accelerator circuits 1020 in some embodiments. The accelerator circuits 1020 may be embodied as any type of processor, co-processor, compute circuit, or other device capable of performing compute or processing operations. For example, the accelerator circuits 1020 may be embodied as, for example, field programmable gate arrays (FPGA), application-specific integrated circuits (ASICs), security co-processors, graphics processing units (GPUs), neuromorphic processor units, quantum computers, machine learning circuits, or other specialized processors, controllers, devices, and/or circuits.

In some embodiments, the accelerator sled 1000 may also include an accelerator-to-accelerator interconnect 1042. Similar to the resource-to-resource interconnect 624 of the sled 600 discussed above, the accelerator-to-accelerator interconnect 1042 may be embodied as any type of communication interconnect capable of facilitating accelerator-to-accelerator communications. In the illustrative embodiment, the accelerator-to-accelerator interconnect 1042 is embodied as a high-speed point-to-point interconnect (e.g., faster than the I/O subsystem 622). For example, the accelerator-to-accelerator interconnect 1042 may be embodied as a QuickPath Interconnect (QPI), an UltraPath Interconnect (UPI), or other high-speed point-to-point interconnect dedicated to processor-to-processor communications. In some embodiments, the accelerator circuits 1020 may be daisy-chained with a primary accelerator circuit 1020 connected to the NIC 832 and memory 720 through the I/O subsystem 622 and a secondary accelerator circuit 1020 connected to the NIC 832 and memory 720 through a primary accelerator circuit 1020.

Referring now to FIG. 11, an illustrative embodiment of the accelerator sled 1000 is shown. As discussed above, the accelerator circuits 1020, communication circuit 830, and optical data connector 834 are mounted to the top side 650 of the chassis-less circuit board substrate 602. Again, the individual accelerator circuits 1020 and communication circuit 830 are mounted to the top side 650 of the chassis-less circuit board substrate 602 such that no two heat-producing, electrical components shadow each other as discussed above. The memory devices 720 of the accelerator sled 1000 are mounted to the bottom side 750 of the of the chassis-less circuit board substrate 602 as discussed above in regard to the sled 600. Although mounted to the bottom side 750, the memory devices 720 are communicatively coupled to the accelerator circuits 1020 located on the top side 650 via the I/O subsystem 622 (e.g., through vias). Further, each of the accelerator circuits 1020 may include a heatsink 1070 that is larger than a traditional heatsink used in a server. As discussed above with reference to the heatsinks 870, the heatsinks 1070 may be larger than traditional heatsinks because of the "free" area provided by the memory resources 720 being located on the bottom side 750 of the chassis-less circuit board substrate 602 rather than on the top side 650.

Figure 12:
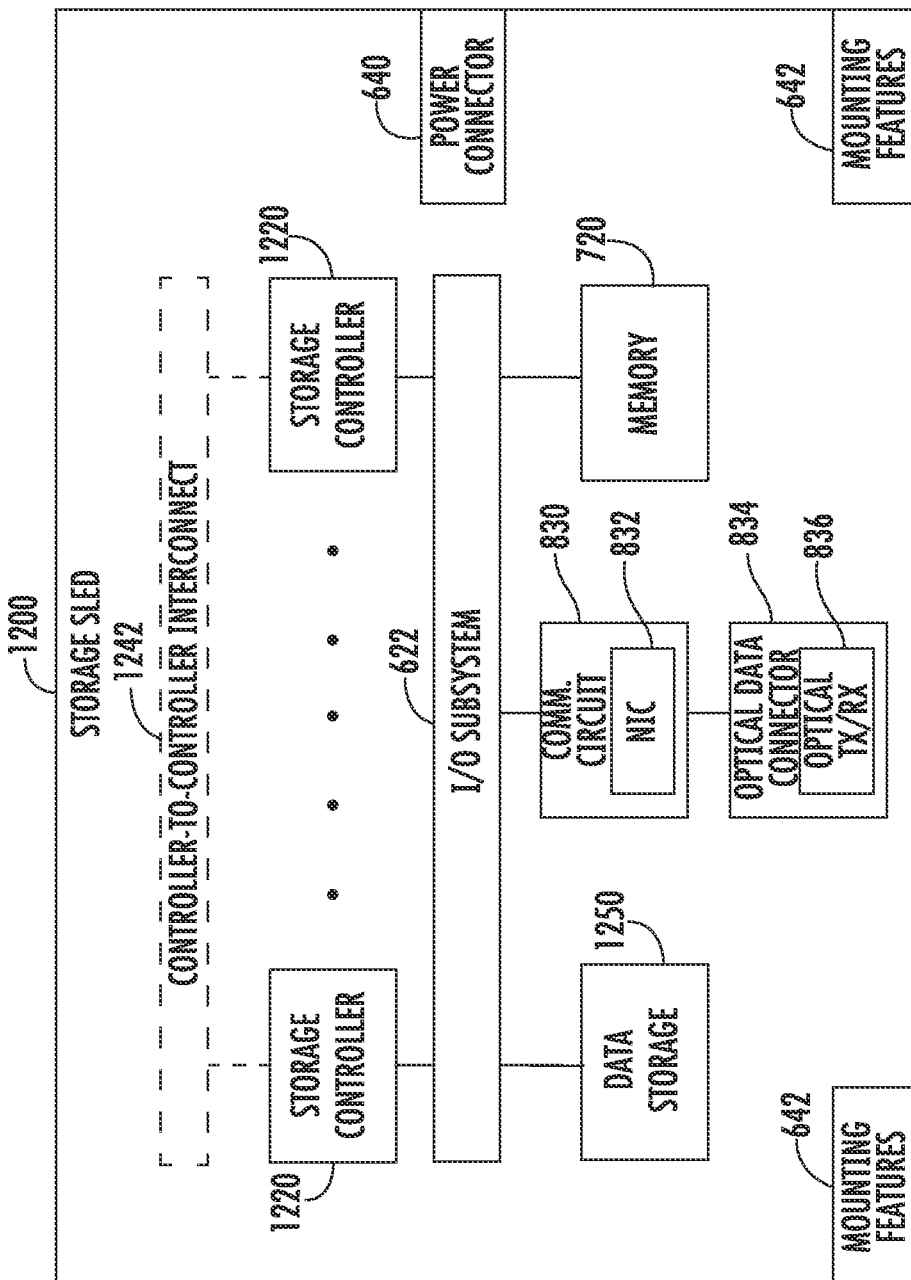
FIG. 12 is a simplified block diagram of at least one embodiment of a storage sled usable in the data center of FIG. 1.

Referring now to FIG. 12, in some embodiments, the sled 400 may be embodied as a storage sled 1200. The storage sled 1200 is configured, to store data in a data storage 1250 local to the storage sled 1200. For example, during operation, a compute sled 800 or an accelerator sled 1000 may store and retrieve data from the data storage 1250 of the storage sled 1200. The storage sled 1200 includes various components similar to components of the sled 400 and/or the compute sled 800, which have been identified in FIG. 12 using the same reference numbers. The description of such components provided above in regard to FIGS. 6, 7, and 8 apply to the corresponding components of the storage sled 1200 and is not repeated herein for clarity of the description of the storage sled 1200.

In the illustrative storage sled 1200, the physical resources 620 are embodied as storage controllers 1220. Although only two storage controllers 1220 are shown in FIG. 12, it should be appreciated that the storage sled 1200 may include additional storage controllers 1220 in other embodiments. The storage controllers 1220 may be embodied as any type of processor, controller, or control circuit capable of controlling the storage and retrieval of data into the data storage 1250 based on requests received via the communication circuit 830. In the illustrative embodiment, the storage controllers 1220 are embodied as relatively low-power processors or controllers. For example, in some embodiments, the storage controllers 1220 may be configured to operate at a power rating of about 75 watts.

In some embodiments, the storage sled 1200 may also include a controller-to-controller interconnect 1242. Similar to the resource-to-resource interconnect 624 of the sled 400 discussed above, the controller-to-controller interconnect 1242 may be embodied as any type of communication interconnect capable of facilitating controller-to-controller communications. In the illustrative embodiment, the controller-to-controller interconnect 1242 is embodied as a high-speed point-to-point interconnect (e.g., faster than the I/O subsystem 622). For example, the controller-to-controller interconnect 1242 may be embodied as a QuickPath Interconnect (QPI), an UltraPath Interconnect (UPI), or other high-speed point-to-point interconnect dedicated to processor-to-processor communications.

Figure 13:
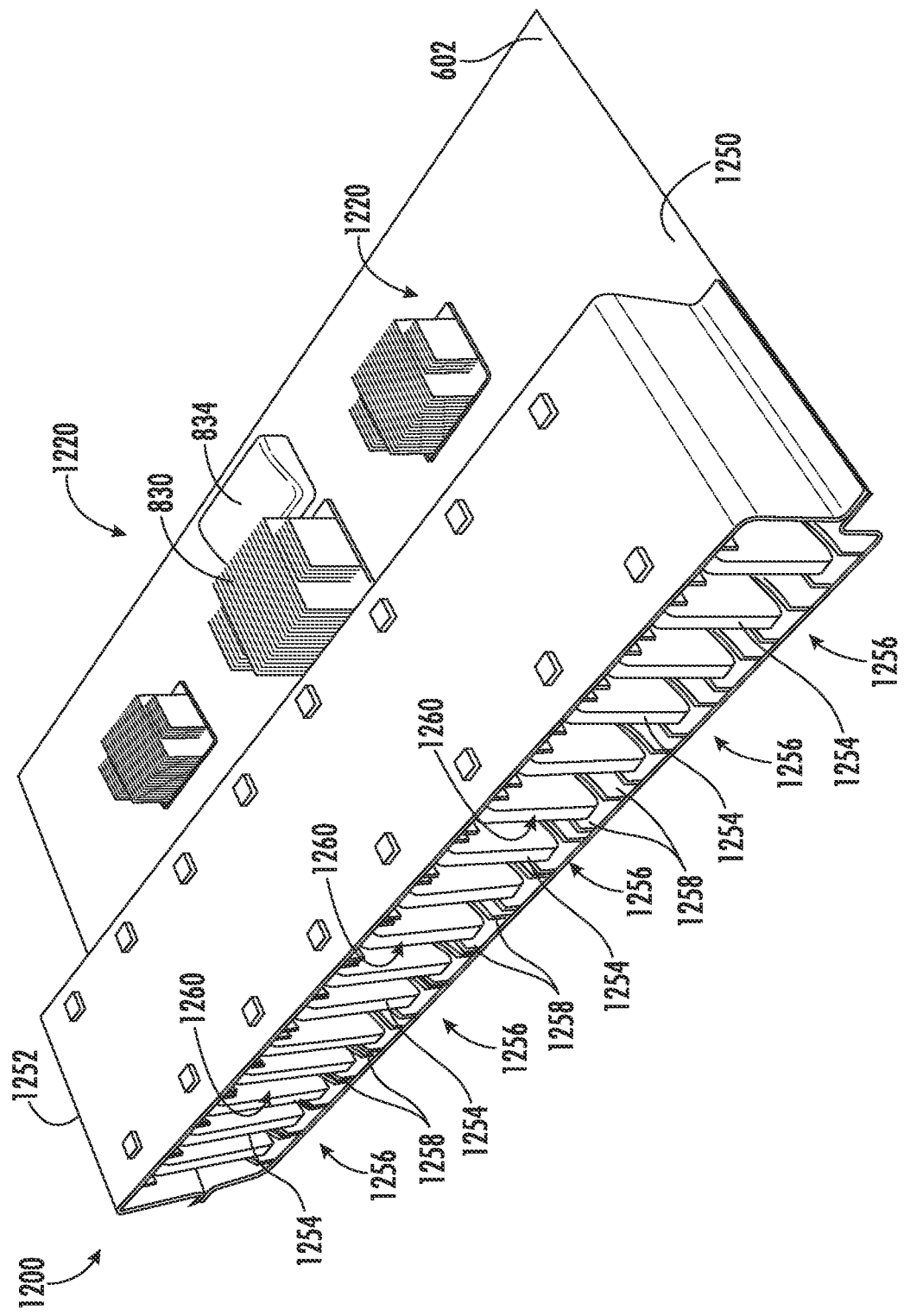
FIG. 13 is a top perspective view of at least one embodiment of the storage sled of FIG. 12.

Referring now to FIG. 13, an illustrative embodiment of the storage sled 1200 is shown. In the illustrative embodiment, the data storage 1250 is embodied as, or otherwise includes, a storage cage 1252 configured to house one or more solid state drives (SSDs) 1254. To do so, the storage cage 1252 includes a number of mounting slots 1256, each of which is configured to receive a corresponding solid state drive 1254. Each of the mounting slots 1256 includes a number of drive guides 1258 that cooperate to define an access opening 1260 of the corresponding mounting slot 1256. The storage cage 1252 is secured to the chassis-less circuit board substrate 602 such that the access openings face away from (i.e., toward the front of) the chassis-less circuit board substrate 602. As such, solid state drives 1254 are accessible while the storage sled 1200 is mounted in a corresponding rack 204. For example, a solid state drive 1254 may be swapped out of a rack 240 (e.g., via a robot) while the storage sled 1200 remains mounted in the corresponding rack 240.

The storage cage 1252 illustratively includes sixteen mounting slots 1256 and is capable of mounting and storing sixteen solid state drives 1254. Of course, the storage cage 1252 may be configured to store additional or fewer solid state drives 1254 in other embodiments. Additionally, in the illustrative embodiment, the solid state drivers are mounted vertically in the storage cage 1252, but may be mounted in the storage cage 1252 in a different orientation in other embodiments. Each solid state drive 1254 may be embodied as any type of data storage device capable of storing long term data. To do so, the solid state drives 1254 may include volatile and non-volatile memory devices discussed above.

As shown in FIG. 13, the storage controllers 1220, the communication circuit 830, and the optical data connector 834 are illustratively mounted to the top side 650 of the chassis-less circuit board substrate 602. Again, as discussed above, any suitable attachment or mounting technology may be used to mount the electrical components of the storage sled 1200 to the chassis-less circuit board substrate 602 including, for example, sockets (e.g., a processor socket), holders, brackets, soldered connections, and/or other mounting or securing techniques.

As discussed above, the individual storage controllers 1220 and the communication circuit 830 are mounted to the top side 650 of the chassis-less circuit board substrate 602 such that no two heat-producing, electrical components shadow each other. For example, the storage controllers 1220 and the communication circuit 830 are mounted in corresponding locations on the top side 650 of the chassis-less circuit board substrate 602 such that no two of those electrical components are linearly in-line with each other along the direction of the airflow path 608.

The memory devices 720 of the storage sled 1200 are mounted to the bottom side 750 of the of the chassis-less circuit board substrate 602 as discussed above in regard to the sled 400. Although mounted to the bottom side 750, the memory devices 720 are communicatively coupled to the storage controllers 1220 located on the top side 650 via the I/O subsystem 622. Again, because the chassis-less circuit board substrate 602 is embodied as a double-sided circuit board, the memory devices 720 and the storage controllers 1220 may be communicatively coupled by one or more vias, connectors, or other mechanisms extending through the chassis-less circuit board substrate 602. Each of the storage controllers 1220 includes a heatsink 1270 secured thereto. As discussed above, due to the improved thermal cooling characteristics of the chassis-less circuit board substrate 602 of the storage sled 1200, none of the heatsinks 1270 include cooling fans attached thereto. That is, each of the heatsinks 1270 is embodied as a fan-less heatsink.

Figure 14:
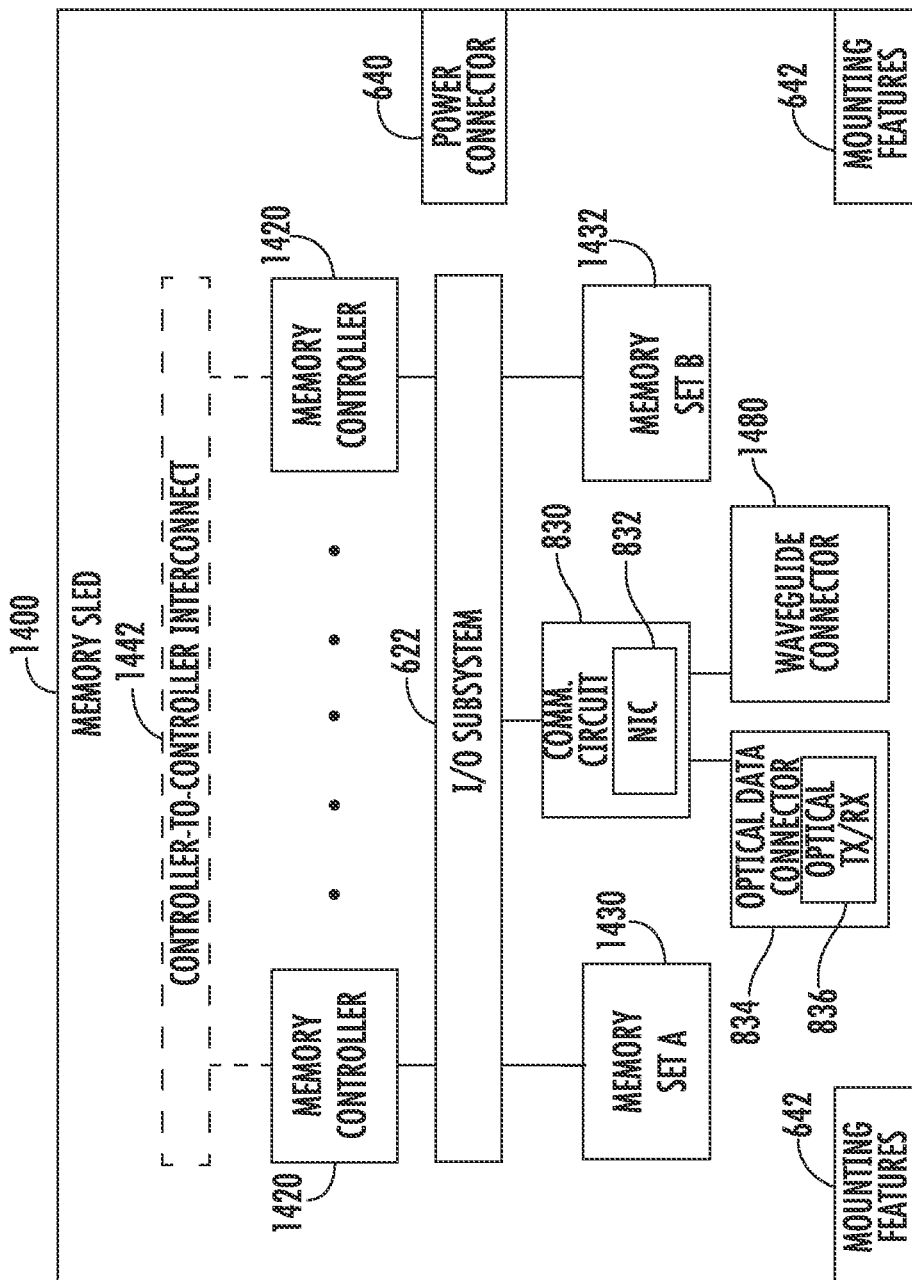
FIG. 14 is a simplified block diagram of at least one embodiment of a memory sled usable in the data center of FIG. 1.

Referring now to FIG. 14, in some embodiments, the sled 400 may be embodied as a memory sled 1400. The storage sled 1400 is optimized, or otherwise configured, to provide other sleds 400 (e.g., compute sleds 800, accelerator sleds 1000, etc.) with access to a pool of memory (e.g., in two or more sets 1430, 1432 of memory devices 720) local to the memory sled 1200. For example, during operation, a compute sled 800 or an accelerator sled 1000 may remotely write to and/or read from one or more of the memory sets 1430, 1432 of the memory sled 1200 using a logical address space that maps to physical addresses in the memory sets 1430, 1432. The memory sled 1400 includes various components similar to components of the sled 400 and/or the compute sled 800, which have been identified in FIG. 14 using the same reference numbers. The description of such components provided above in regard to FIGS. 6, 7, and 8 apply to the corresponding components of the memory sled 1400 and is not repeated herein for clarity of the description of the memory sled 1400.

In the illustrative memory sled 1400, the physical resources 620 are embodied as memory controllers 1420. Although only two memory controllers 1420 are shown in FIG. 14, it should be appreciated that the memory sled 1400 may include additional memory controllers 1420 in other embodiments. The memory controllers 1420 may be embodied as any type of processor, controller, or control circuit capable of controlling the writing and reading of data into the memory sets 1430, 1432 based on requests received via the communication circuit 830. In the illustrative embodiment, each memory controller 1420 is connected to a corresponding memory set 1430, 1432 to write to and read from memory devices 720 within the corresponding memory set 1430, 1432 and enforce any permissions (e.g., read, write, etc.) associated with sled 400 that has sent a request to the memory sled 1400 to perform a memory access operation (e.g., read or write).

In some embodiments, the memory sled 1400 may also include a controller-to-controller interconnect 1442. Similar to the resource-to-resource interconnect 624 of the sled 400 discussed above, the controller-to-controller interconnect 1442 may be embodied as any type of communication interconnect capable of facilitating controller-to-controller communications. In the illustrative embodiment, the controller-to-controller interconnect 1442 is embodied as a high-speed point-to-point interconnect (e.g., faster than the I/O subsystem 622). For example, the controller-to-controller interconnect 1442 may be embodied as a QuickPath Interconnect (QPI), an UltraPath Interconnect (UPI), or other high-speed point-to-point interconnect dedicated to processor-to-processor communications. As such, in some embodiments, a memory controller 1420 may access, through the controller-to-controller interconnect 1442, memory that is within the memory set 1432 associated with another memory controller 1420. In some embodiments, a scalable memory controller is made of multiple smaller memory controllers, referred to herein as "chiplets", on a memory sled (e.g., the memory sled 1400). The chiplets may be interconnected (e.g., using EMIB (Embedded Multi-Die Interconnect Bridge)). The combined chiplet memory controller may scale up to a relatively large number of memory controllers and I/O ports, (e.g., up to 16 memory channels). In some embodiments, the memory controllers 1420 may implement a memory interleave (e.g., one memory address is mapped to the memory set 1430, the next memory address is mapped to the memory set 1432, and the third address is mapped to the memory set 1430, etc.). The interleaving may be managed within the memory controllers 1420, or from CPU sockets (e.g., of the compute sled 800) across network links to the memory sets 1430, 1432, and may improve the latency associated with performing memory access operations as compared to accessing contiguous memory addresses from the same memory device.

Further, in some embodiments, the memory sled 1400 may be connected to one or more other sleds 400 (e.g., in the same rack 240 or an adjacent rack 240) through a waveguide, using the waveguide connector 1480. In the illustrative embodiment, the waveguides are 64 millimeter waveguides that provide 16 Rx (i.e., receive) lanes and 16 Tx (i.e., transmit) lanes. Each lane, in the illustrative embodiment, is either 16 GHz or 32 GHz. In other embodiments, the frequencies may be different. Using a waveguide may provide high throughput access to the memory pool (e.g., the memory sets 1430, 1432) to another sled (e.g., a sled 400 in the same rack 240 or an adjacent rack 240 as the memory sled 1400) without adding to the load on the optical data connector 834.

Figure 15:
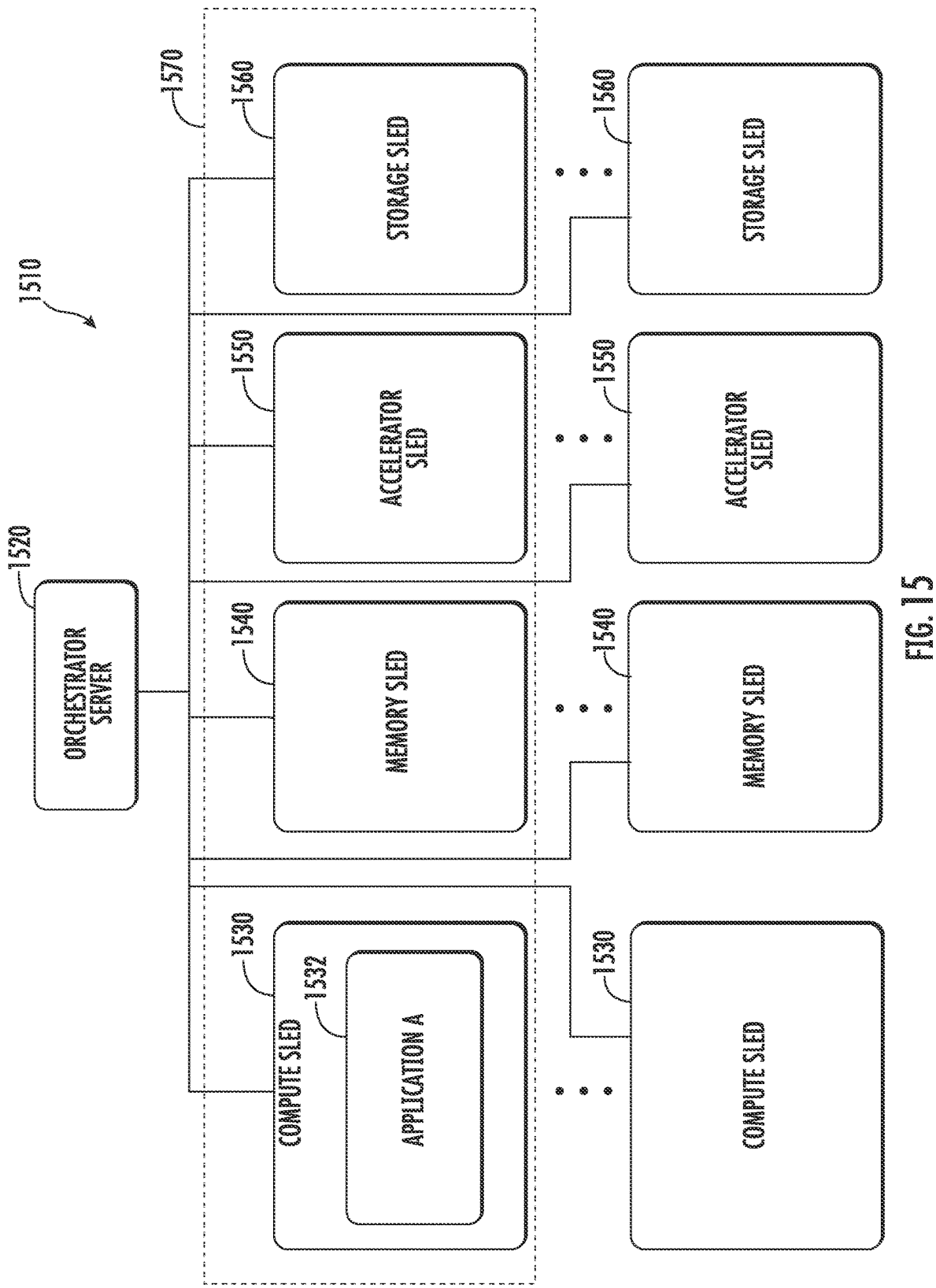
FIG. 15 is a simplified block diagram of a system that may be established within the data center of FIG. 1 to execute workloads with managed nodes composed of disaggregated resources.

Referring now to FIG. 15, a system for executing one or more workloads (e.g., applications) may be implemented in accordance with the data center 100. In the illustrative embodiment, the system 1510 includes an orchestrator server 1520, which may be embodied as a managed node comprising a compute device (e.g., a processor 820 on a compute sled 800) executing management software (e.g., a cloud operating environment, such as OpenStack) that is communicatively coupled to multiple sleds 400 including a large number of compute sleds 1530 (e.g., each similar to the compute sled 800), memory sleds 1540 (e.g., each similar to the memory sled 1400), accelerator sleds 1550 (e.g., each similar to the memory sled 1000), and storage sleds 1560 (e.g., each similar to the storage sled 1200). One or more of the sleds 1530, 1540, 1550, 1560 may be grouped into a managed node 1570, such as by the orchestrator server 1520, to collectively host a workload (e.g., which may be an application 1532 executed in a virtual machine or in a container, an application 1532 executing as part of system software, etc.). The managed node 1570 may be embodied as an assembly of physical resources 620, such as processors 820, memory resources 720, accelerator circuits 1020, or data storage 1250, from the same or different sleds 400. Further, the managed node may be established, defined, or "spun up" by the orchestrator server 1520 at the time a workload is to be assigned to the managed node or at any other time, and may exist regardless of whether any workloads are presently assigned to the managed node. In the illustrative embodiment, the orchestrator server 1520 may selectively allocate and/or deallocate physical resources 620 from the sleds 400 and/or add or remove one or more sleds 400 from the managed node 1570 as a function of quality of service (QoS) targets (e.g., performance targets associated with a throughput, latency, instructions per second, etc.) associated with a service level agreement for the workload (e.g., the application 1532). In doing so, the orchestrator server 1520 may receive telemetry data indicative of performance conditions (e.g., throughput, latency, instructions per second, etc.) in each sled 400 of the managed node 1570 and compare the telemetry data to the quality of service targets to determine whether the quality of service targets are being satisfied. The orchestrator server 1520 may additionally determine whether one or more physical resources may be deallocated from the managed node 1570 while still satisfying the QoS targets, thereby freeing up those physical resources for use in another managed node (e.g., to execute a different workload). Alternatively, if the QoS targets are not presently satisfied, the orchestrator server 1520 may determine to dynamically allocate additional physical resources to assist in the execution of the workload (e.g., the application 1532) while the workload is executing. Similarly, the orchestrator server 1520 may determine to dynamically deallocate physical resources from a managed node if the orchestrator server 1520 determines that deallocating the physical resource would result in QoS targets still being met.

Additionally, in some embodiments, the orchestrator server 1520 may identify trends in the resource utilization of the workload (e.g., the application 1532), such as by identifying phases of execution (e.g., time periods in which different operations, each having different resource utilizations characteristics, are performed) of the workload (e.g., the application 1532) and pre-emptively identifying available resources in the data center 100 and allocating them to the managed node 1570 (e.g., within a predefined time period of the associated phase beginning). In some embodiments, the orchestrator server 1520 may model performance based on various latencies and a distribution scheme to place workloads among compute sleds and other resources (e.g., accelerator sleds, memory sleds, storage sleds) in the data center 100. For example, the orchestrator server 1520 may utilize a model that accounts for the performance of resources on the sleds 400 (e.g., FPGA performance, memory access latency, etc.) and the performance (e.g., congestion, latency, bandwidth) of the path through the network to the resource (e.g., FPGA). As such, the orchestrator server 1520 may determine which resource(s) should be used with which workloads based on the total latency associated with each potential resource available in the data center 100 (e.g., the latency associated with the performance of the resource itself in addition to the latency associated with the path through the network between the compute sled executing the workload and the sled 400 on which the resource is located).

In some embodiments, the orchestrator server 1520 may generate a map of heat generation in the data center 100 using telemetry data (e.g., temperatures, fan speeds, etc.) reported from the sleds 400 and allocate resources to managed nodes as a function of the map of heat generation and predicted heat generation associated with different workloads, to maintain a target temperature and heat distribution in the data center 100. Additionally or alternatively, in some embodiments, the orchestrator server 1520 may organize received telemetry data into a hierarchical model that is indicative of a relationship between the managed nodes (e.g., a spatial relationship such as the physical locations of the resources of the managed nodes within the data center 100 and/or a functional relationship, such as groupings of the managed nodes by the customers the managed nodes provide services for, the types of functions typically performed by the managed nodes, managed nodes that typically share or exchange workloads among each other, etc.). Based on differences in the physical locations and resources in the managed nodes, a given workload may exhibit different resource utilizations (e.g., cause a different internal temperature, use a different percentage of processor or memory capacity) across the resources of different managed nodes. The orchestrator server 1520 may determine the differences based on the telemetry data stored in the hierarchical model and factor the differences into a prediction of future resource utilization of a workload if the workload is reassigned from one managed node to another managed node, to accurately balance resource utilization in the data center 100.

To reduce the computational load on the orchestrator server 1520 and the data transfer load on the network, in some embodiments, the orchestrator server 1520 may send self-test information to the sleds 400 to enable each sled 400 to locally (e.g., on the sled 400) determine whether telemetry data generated by the sled 400 satisfies one or more conditions (e.g., an available capacity that satisfies a predefined threshold, a temperature that satisfies a predefined threshold, etc.). Each sled 400 may then report back a simplified result (e.g., yes or no) to the orchestrator server 1520, which the orchestrator server 1520 may utilize in determining the allocation of resources to managed nodes.

Figure 16:
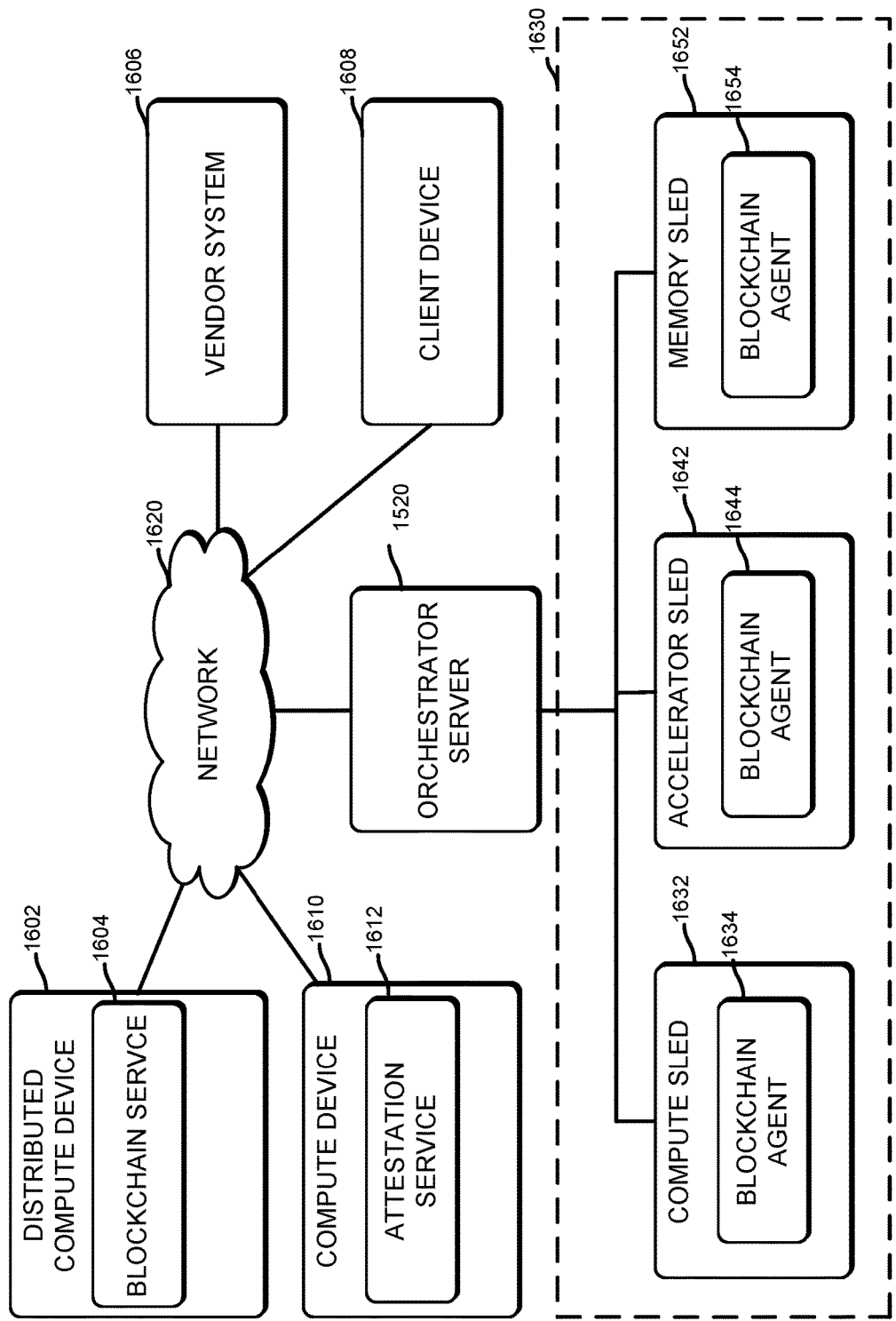
FIG. 16 is a simplified block diagram of at least one embodiment of a compute environment for providing attestation of a managed node for a deployed workload using a blockchain in a sled of the managed node.

Referring now to FIG. 16, a simplified block diagram of an illustrative compute environment 1600 in which a blockchain service is used to maintain managed node attestation information that a deployed workload may consult, which may be established in, for example, the system 1510. Illustratively, the example compute environment 1600 includes the orchestrator server 1520, a managed node 1630 (composed of a compute sled 1632, accelerator sled 1642, and memory sled 1652), a distributed compute device 1602, a vendor system 1606, and a client device 1608, each interconnected via a network 1620. The managed node 1630 is composed of resources from one or more sleds, such as compute resources from the compute sled 1632, accelerator resources from the accelerator sled 1642, and memory resources from the memory sled 1652. Of course, the managed node 1630 may include other sleds not depicted herein.

As further disclosed herein, the distributed compute device 1602 provides a blockchain service 1604 that maintains a history of the lifecycle of the managed node 1630 and individual sleds forming the managed node 1630. The orchestrator server 1520 may use the blockchain service 1604 to determine whether the managed node 1630 meets requirements for executing a given workload (e.g., hardware and software requirements specified by a customer). The blockchain generated by the blockchain service 1604 may be used to attest (e.g., to a requesting remote device such as the client device 1608) that the managed node 1630 (or the individual sleds forming the managed node 1630) is configured according to one or more specifications. For example, one or more workloads of a user may execute on the managed node 1630. The user may want to ensure that the managed node 1630, while executing the workload, is physically located in a desired geolocation, according to a specific sled configuration, software environment, and/or the like. The user may also want to ensure that individual sleds in the managed node 1630 have a specified system configuration, operating system version, firmware version, and/or the like. Further, FIG. 16 also depicts an attestation service 1612 (executing on a compute device 1610) used to attest one or more parameters of the managed node 1630 using the blockchain data generated by the blockchain service 1604.

The blockchain service 1604 generates and maintains a blockchain which is associated with the managed node 1630 and which provides information about components of the managed node 1630, compute sled 1632, accelerator sled 1642, or memory sled 1652. Generally, a blockchain is a distributed ledger that maintains numerous records (also referred to herein as "blocks") that are linked to one another based on cryptography, such as by a cryptographic hash. In other cases, the blockchain may be implemented as a Merkel tree or as part of a private blockchain service. A block in the blockchain may reference a cryptographic hash of the preceding block. Doing so establishes a permanent record of transactions occurring in the blockchain that is resistant to data modification (e.g., tampering with the blockchain will result in hash values mismatching at the point of modification). To provide robustness in the blockchain, in some embodiments, the distributed compute device 1602 is one of multiple distributed compute devices 1602 forming a cloud service platform that provides the blockchain service 1604 and maintains copies of the blockchains associated with each sled of the system 1510. In some cases, the distributed compute devices 1602 are a trusted third party (e.g., a private trusted third party, blockchain consortia, etc.) used to attest a given managed node 1630.

In some embodiments, the blockchain service 1604 generates a new block for each stage of a lifecycle (based on a request to generate the block at the stage) of a sled of the managed node 1630, such as the compute sled 1632, accelerator sled 1642, or memory sled 1652. For instance, when a vendor system 1606 enters parameters or specifications to create the compute sled 1632, the vendor system 1606 may send the parameters to the blockchain service 1604. For example, the parameters may include a system configuration, firmware version, operating system version, and the like. In turn, the blockchain service 1604 generates an initial blockchain that includes a block storing the parameters. Then, when the vendor system 1606 builds the compute sled 1632 and ships the sled 1530 (e.g., to a data center), the vendor system 1606 sends, to the blockchain service 1604, the parameters associated with the shipped version of the compute sled 1632. These parameters can also include serial numbers of each component on the compute sled 1632 and any identifiers associated with the compute sled 1632. In turn, the blockchain service 1604 creates a new block for the blockchain that includes the actual parameters. Other instances of where the blockchain service 1604 creates a block for the blockchain includes when the compute sled 1632 arrives at a different shipping points, arrives at the specified destination.

Further, once in operation, a sled in the managed node 1630 (e.g., compute sled 1632, accelerator sled 1642, memory sled 1652, etc.) may send updates to parameters of the compute sled 1632 to the blockchain service 1604. In particular, a blockchain agent 1634 may execute on the compute sled 1632 and log a manifest of the current parameters of the compute sled 1632 (e.g., currently installed hardware, software, firmware, and so on). Further, the blockchain agent 1634 may monitor changes to the compute sled 1632, such as firmware updates, changes in geolocation, operating system version updates, software installations, hardware component installations, and the like. The blockchain agent 1634 may also detect instances where the compute sled 1632 is brought offline or installed in a new rack. Further still, the blockchain agent 1634 may detect instances where a user workload is deployed thereon. Once detected, the blockchain agent 1634 may send an indication of the changes to the blockchain service 1604. In response, the blockchain service 1604 may create a block for the blockchain associated with the compute sled 1632, where the block is indicative of the changes to the compute sled 1632. Note, blockchain agents 1644 and 1654 executing on the accelerator sled 1642 and memory sled 1652, respectively, may perform similar functions as the blockchain agent 1634. Further, in some embodiments, the blockchain agent (e.g., blockchain agent 1634) may be embodied as hardware executing on one or more of the sleds of the managed node 1630. In such a case, the blockchain agent is independent of any workload or software environment executing as part of the managed node 1630.

Because the blockchain is maintained amongst distributed compute devices 1602, the blockchain is difficult to tamper, which provides a reliable source for attestation. For instance, the client device 1608 may query the attestation service 1612. For instance, the client device 1608 may do so via a web browser executing on the client device 1608 and accessing a web portal representative of the attestation service 1612. The query may include a request to the attestation service 1612 to attest one or more parameters of a given managed node 1630. For example, the client device 1608 (or the orchestration server 1520) may request that the attestation service 1612 attest that a managed node 1630 is configured according to previously agreed-upon terms (e.g., that the managed node 1630 is executing the workload in a specified geolocation, under certain physical resource and individual sled requirements, and the like). The attestation service 1612 may then query the blockchain service 1604 to determine, based on the blockchain associated with the managed node 1630, whether the managed node 1630 is valid. In turn, the blockchain service 1604 may identify the blockchain associated with the managed node 1630 and validate the blockchain to ensure that the blockchain has not been tampered. Once validated, the blockchain service 1604 returns an indication that the managed node 1630 is valid and outputs the blockchain content to the attestation service 1612. The attestation service 1612 may then notify the requesting client device 1608 of the attestation, e.g., as a digest describing the managed node 1630 relative to the workload being executed. In other cases, the blockchain service 1604 may output to the orchestration server 1520 that the managed node 1630 is configured according to previously agreed-upon terms, and in turn, the orchestration server 1520 may allow the managed node 1630 to deploy a given workload.

Figure 17:
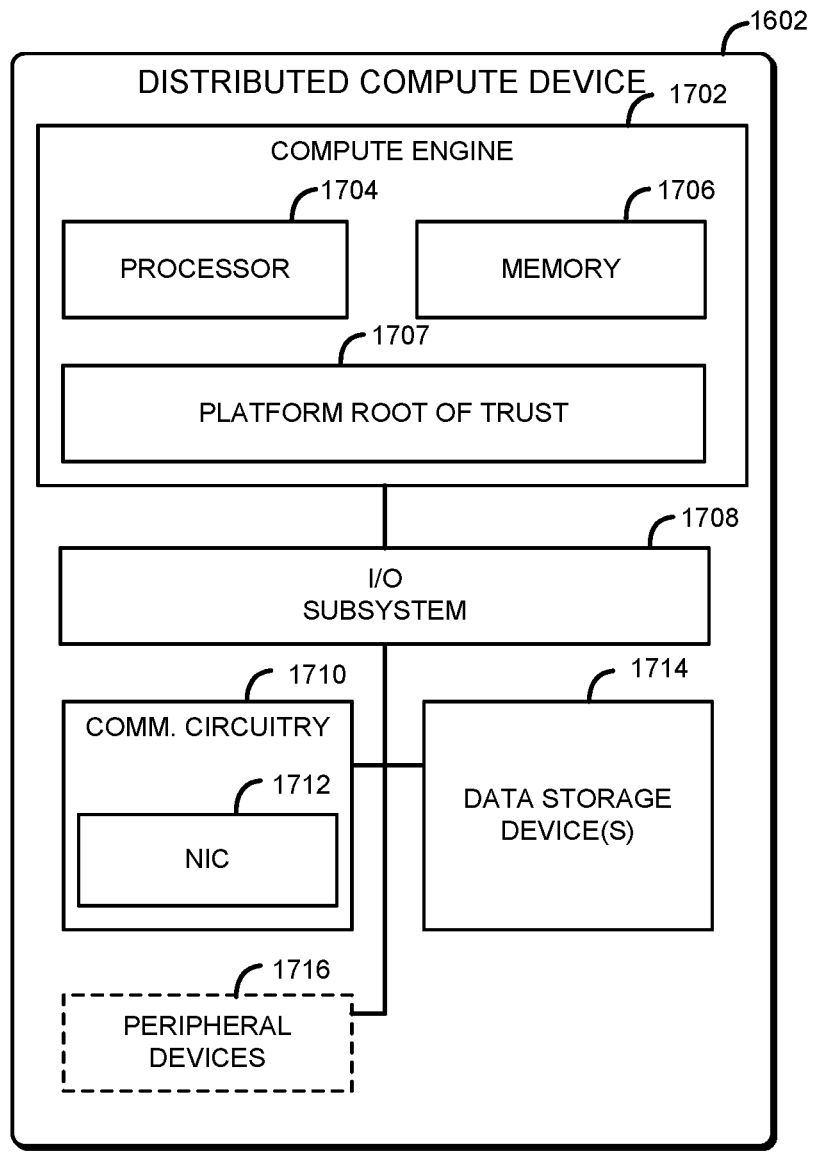
FIG. 17 is a simplified block diagram of at least one embodiment of a distributed compute device of the system of FIG. 16.

Referring now to FIG. 17, the distributed compute device 1602 may be embodied as any type of compute device capable of performing the functions described herein, including receiving a request from a remote device (e.g., client device 1608) to attest one or more parameters of the managed node 1630, retrieving a blockchain associated with the managed node 1630, validating the blockchain, and attesting the one or more parameters of the managed node 1630 using the blockchain.

As shown in FIG. 17, the illustrative distributed compute device 1602 includes a compute engine 1702, an input/output (I/O) subsystem 1708, communication circuitry 1710, and one or more data storage devices 1714. Of course, in other embodiments, the distributed compute device 1602 may include other or additional components, such as those commonly found in a computer (e.g., display, peripheral devices, etc.), such as peripheral devices 1716. Additionally, in some embodiments, one or more of the illustrative components may be incorporated in, or otherwise form a portion of, another component.

The compute engine 1702 may be embodied as any type of device or collection of devices capable of performing various compute functions described below. In some embodiments, the compute engine 1702 may be embodied as a single device such as an integrated circuit, an embedded system, a FPGA, a system-on-a-chip (SOC), or other integrated system or device. Additionally, in some embodiments, the compute engine 1702 includes or is embodied as a processor 1704, a memory 1706, and a platform root of trust 1707. The platform root of trust 1707 may be embodied as any type of device or collection of devices capable of attesting one or more characteristics of a managed node 1630 or an individual sled forming the managed node 1630. The platform root of trust 1707 may measure the compute device 1602 at boot and provide the manifest to an attestation service. For example, the platform root of trust 1707 may be embodied as a trusted platform module (TPM).

The processor 1704 may be embodied as one or more processors, each processor being a type capable of performing the functions described herein. For example, the processor 1704 may be embodied as a single or multi-core processor(s), a microcontroller, or other processor or processing/controlling circuit. In some embodiments, the processor 1704 may be embodied as, include, or be coupled to an FPGA, an ASIC, reconfigurable hardware or hardware circuitry, or other specialized hardware to facilitate performance of the functions described herein.

The memory 1706 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include future generation nonvolatile devices, such as a three dimensional crosspoint memory device (e.g., Intel 3D XPoint™ memory), or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some embodiments, all or a portion of the memory 1706 may be integrated into the processor 1704. In operation, the memory 1706 may store various software and data used during operation such as blockchain information associated with the managed node 1630 (or individual sleds such as 1540, 1550, and 1560).

The compute engine 1702 is communicatively coupled with other components of the distributed compute device 1602 via the I/O subsystem 1708, which may be embodied as circuitry and/or components to facilitate input/output operations with the compute engine 1702 (e.g., with the processor 1704 and/or the memory 1706), as well as other distributed compute devices 1602, if applicable. For example, the I/O subsystem 1708 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 1708 may form a portion of a system-on-a-chip (SoC) and be incorporated, along with one or more of the processor 1704, the memory 1706, and other components of the distributed compute device 1602, into the compute engine 1702.

The communication circuitry 1710 may be embodied as any communication circuit, device, or collection thereof, capable of enabling communications over the network 1620 between the distributed compute device 1602 and another compute device (e.g., the vendor system 1606, client device 1608, orchestrator server 1520, compute sled 1632, etc.). The communication circuitry 1710 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 1710 includes a network interface controller (NIC) 1712, which may also be referred to as a host fabric interface (HFI). The NIC 1712 may be embodied as one or more add-in-boards, daughter cards, network interface cards, controller chips, chipsets, or other devices that may be used by the distributed compute device 1602 to connect with another compute device. In some embodiments, the NIC 1712 may be embodied as part of a system-on-a-chip (SoC) that includes one or more processors, or included on a multichip package that also contains one or more processors. In some embodiments, the NIC 1712 may include a local processor (not shown) and/or a local memory (not shown) that are both local to the NIC 1712. In such embodiments, the local processor of the NIC 1712 may be capable of performing one or more of the functions of the compute engine 1702 described herein. Additionally or alternatively, in such embodiments, the local memory of the NIC 1712 may be integrated into one or more components of the distributed compute device 1602 at the board level, socket level, chip level, and/or other levels.

The one or more illustrative data storage devices 1714, may be embodied as any type of devices configured for short-term or long-term storage of data such as, for example, memory devices and circuits, memory cards, hard disk drives (HDDs), solid-state drives (SSDs), or other data storage devices. Each data storage device 1714 may include a system partition that stores data and firmware code for the data storage device 1714. Each data storage device 1714 may also include an operating system partition that stores data files and executables for an operating system.

Additionally or alternatively, the distributed compute device 1602 may include one or more peripheral devices 1716. Such peripheral devices 1716 may include any type of peripheral device commonly found in a compute device such as a display, speakers, a mouse, a keyboard, and/or other input/output devices, interface devices, and/or other peripheral devices.

Figure 18:
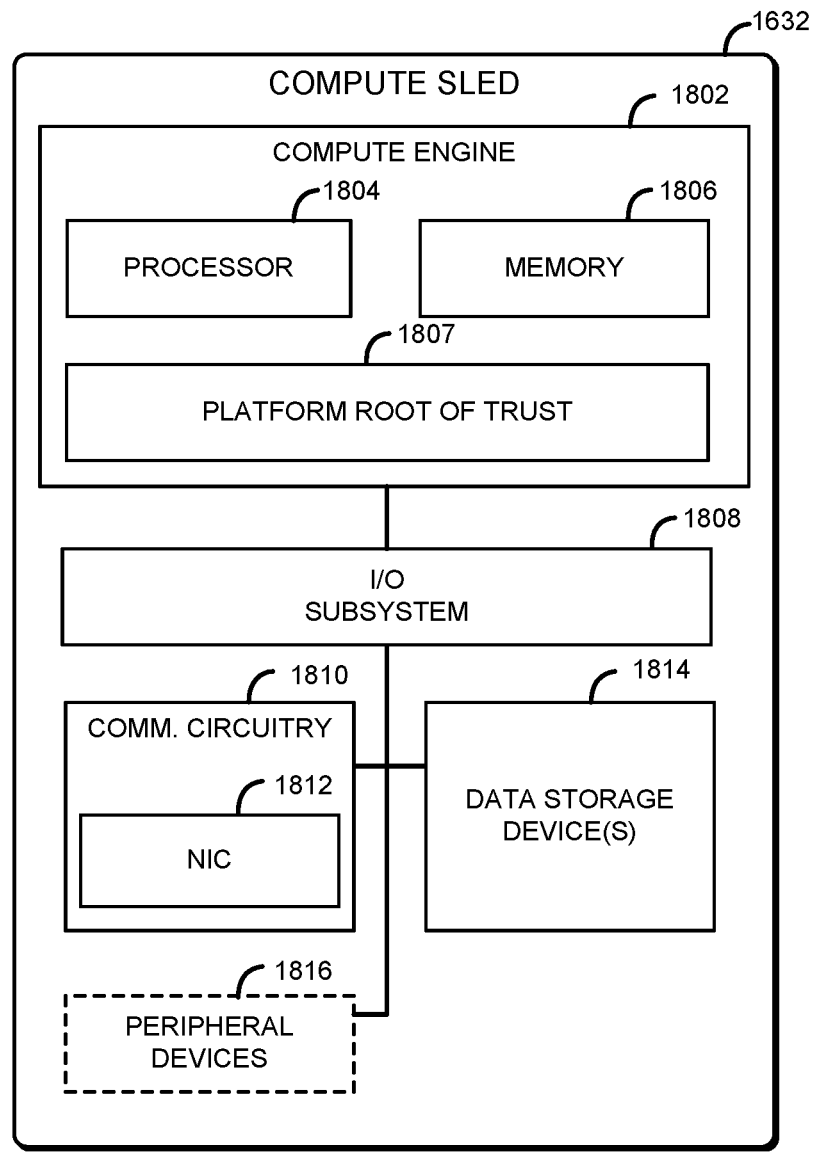
FIG. 18 is a simplified block diagram of at least one embodiment of a sled of a managed node.

Referring now to FIG. 18, the compute sled 1632 may be embodied as any type of compute device capable of performing the functions described herein, including detecting a trigger in change criteria, identifying the change criteria based on the trigger, sending an indication of the change to the blockchain service 1604, and receiving, in response, an updated blockchain from the blockchain service 1604.

As shown in FIG. 18, the illustrative compute sled 1632 includes a compute engine 1802, an input/output (I/O) subsystem 1808, communication circuitry 1810, and one or more data storage devices 1814. Of course, in other embodiments, the compute sled 1632 may include other or additional components, such as those commonly found in a computer (e.g., display, peripheral devices, etc.). Additionally, in some embodiments, one or more of the illustrative components may be incorporated in, or otherwise form a portion of, another component.

The compute engine 1802 may be embodied as any type of device or collection of devices capable of performing various compute functions described below, and is similar to the compute engine 1702 of FIG. 17. The processor 1804 may be embodied as one or more processors, and is similar to the processor 1704 described relative to FIG. 17. The memory 1806 may be embodied as any type of volatile (e.g., DRAM, etc.) or non-volatile memory or data storage capable of performing the functions described herein. In operation, the memory 1806 may store various software and data used during operation. The platform root of trust 1807 is similar to the platform root of trust 1707 described relative to FIG. 17. The I/O subsystem 1808 is similar to the I/O subsystem 1708 described with reference to FIG. 17. The communication circuitry 1810, which, in the illustrative embodiment, includes a NIC 1812, is similar to the communication circuitry 1710 and NIC 1712 described with reference to FIG. 17. Additionally, the data storage devices 1814 are similar to the data storage devices 1714 described with reference to FIG. 17. Further, the peripheral devices 1816 are similar to the peripheral devices 1716, described with reference to FIG. 17.

The orchestrator server 1520 and client device 1608 may have components similar to those described in FIGS. 17 and 18. Further, it should be appreciated that any of the sleds of the managed node 1630 (e.g., accelerator sled 1642 and memory sled 1652), the orchestrator server 1520, or the client device 1608 may include other components, subcomponents, and devices commonly found in a computing device, which are not discussed above in reference to the compute sled 1632 and the distributed compute device 1602 and not discussed herein for clarity of the description.

Figure 19:
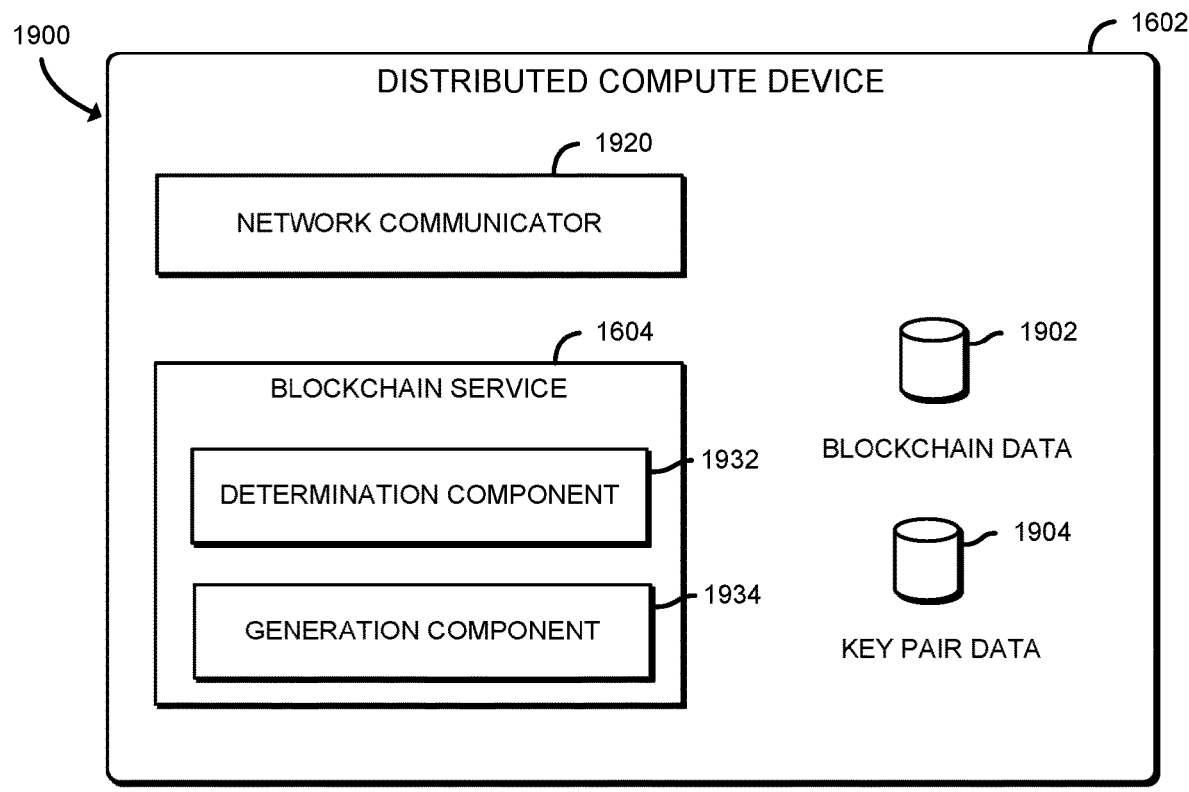
FIG. 19 is a simplified block diagram of at least one embodiment of an environment that may be established by the distributed compute device of FIGS. 16 and 17.

As described above, the orchestrator server 1520, other sleds of the managed node 1630 (e.g., accelerator sled 1642 and memory sled 1652), vendor system 1606, client device 1608, and the distributed compute device 1602 are illustratively in communication via the network 1620, which may be embodied as any type of wired or wireless communication network, including global networks (e.g., the Internet), local area networks (LANs) or wide area networks (WANs), cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), or any combination thereof Referring now to FIG. 19, the distributed compute device 1602 may establish an environment 1900 during operation. The illustrative environment 1900 includes a network communicator 1920 and the blockchain service 1604. Each of the components of the environment 1900 may be embodied as hardware, firmware, software, or a combination thereof. As such, in some embodiments, one or more of the components of the environment 1900 may be embodied as circuitry or a collection of electrical devices (e.g., network communicator circuitry 1920, blockchain service circuitry 1604, etc.). It should be appreciated that, in such embodiments, one or more of the network communicator circuitry 1920 or blockchain service circuitry 1604 may form a portion of one or more of the compute engine 1702, the communication circuitry 1710, the I/O subsystem 1708 and/or other components of the distributed compute device 1602. In the illustrative embodiment, the environment 1900 includes blockchain data 1902, which may be embodied as any data indicative of one or more blockchain structures generated and maintained for a given compute device, such as the compute sled 1632. The environment 1900 also includes key pair data 1904, which may be embodied as any data indicative of a cryptographic key data (e.g., public and private key pairs) associated with each blockchain of the blockchain data 1902. The distributed compute device 1902 may use the private key of the key pair data 1904 to sign a hash for a given blockchain and to validate the blockchain in subsequent use.

In the illustrative environment 1900, the network communicator 1920, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from the distributed compute device 1602, respectively. To do so, the network communicator 1920 is configured to receive and process data packets from one system or computing device (e.g., a compute sled 1632, the orchestrator server 1520, client device 1608, etc.) and to prepare and send data packets to a computing device or system (e.g., the compute sled 1632, the orchestrator server 1220, etc.). Accordingly, in some embodiments, at least a portion of the functionality of the network communicator 1920 may be performed by the communication circuitry 1710, and, in the illustrative embodiment, by the NIC 1712.

The blockchain service 1604, which may be embodied as hardware, firmware, software, virtualized hardware, emulated architecture, and/or a combination thereof, is to maintain blockchain records for a given compute device, such as the compute sled 1632. The blockchain service 1604 is also to receive a request to attest one or more parameters (e.g., workload execution, system configuration, firmware version, operating system version, etc.), retrieve a blockchain associated with the compute device, validate the blockchain, and attest the one or more parameters using the blockchain. To do so, the blockchain service 1604 includes a determination component 1932 and a generation component 1934.

The determination component 1932, in the illustrative embodiment, is configured to receive (e.g., from the vendor system 1606, orchestrator server 1520, compute sled 1632, etc.), one or more parameters associated with a given compute device, such as one or more sleds of the managed node 1630 (e.g., the compute sled 1632, accelerator sled 1642, memory sled 1652, etc.). For instance, the determination component 1932 may receive parameters from the vendor system 1606 for a new compute device, wherein the parameters include a system configuration and information describing the hardware components. As another example, the determination component 1932 may receive parameters of the compute sled 1632 from the orchestrator server 1520 (or the compute sled 1632) that are updated from previously recorded parameters by the blockchain service 1604. The parameters may include an identifier associated with a compute device for a corresponding blockchain. The identifier may be, for example, a serial number of the compute device or a universally unique identifier (UUID) usable by the determination component 1932 to identify a blockchain for a compute device associated with the parameters.

The determination component 1932 is also configured to validate a blockchain once identified. As stated, each block in a given blockchain may include a hash value associated with a previous block. A hash value of a given block that does not match the previous hash value provided in the subsequent block may indicate that the blockchain has been modified in an unauthorized manner. The determination component 1932 may validate the previous cryptographic hash value in each block to ensure that the blockchain has not been modified in an unauthorized manner.

The generation component 1934 is configured to create a blockchain for a given compute device, such as the managed node 1630. For example, the generation component 1934 may receive parameters from the determination component 1932. The generation component 1934 may create a block entry that is indicative of a blockchain transaction that includes the parameters as content to be included with the block entry. The block entry may include, in addition to the parameters, an index value of the block entry and a timestamp indicating a date and time the block entry was created. Further, the generation component 1934 also determines a cryptographic hash for the parameters included with the block entry. The generation component 1934 may use a variety of cryptographic hash functions to do so, e.g., SHA-256, SHA-1, MD5, and so on. The generation component 1934 may store the blockchain as blockchain data 1902. The generation component 1934 may also store an identifier of the compute device as part of the blockchain data 1902 to associate the compute device with the blockchain (e.g., for subsequent retrieval). The generation component 1934 may also distribute the blockchain to other distributed compute devices 1602 for storage (e.g., as blockchain data 1902).

The generation component 1934 is also configured to update the blockchain in cases in which the given compute device undergoes an identifiable change, such as a firmware version update, installation of new hardware components, system configuration updates, and the like. For instance, the generation component 1934 may create a new block entry (in a similar manner as previously described) for the associated blockchain that includes, as content in the block, the changes made to the compute device. The generation component 1934 is also configured to update the blockchain in cases where the given compute device deploys a user workload. In such a case, the generation component 1934 may create a new block entry (in a similar manner as previously described) for the associated blockchain that includes, as content in the block, information describing the workload, such as the user associated with the workload, identifier associated with the workload, other systems executing the workload, resource requirements of the workload, service level agreement requirements for the workload, a date and time indicative of when the workload was initialized, and the like. The generation component 1934 may also associate the workload identifier with the given blockchain (e.g., by storing the identifier with the blockchain data 1902).

The blockchain service 1604 is also configured to handle attestation queries, e.g., sent by the attestation service 1612. The blockchain service 1604 may validate (e.g., by the hardware platform root of trust 1707) a blockchain associated with a given managed node 1630, which allows the attestation service 1612 to attest one or more parameters associated with a compute device using the associated blockchain. For example, the blockchain service 1604 may receive a request from the attestation service 1612 to validate a blockchain associated with a given managed node 1630 or individual sled. For example, the attestation service 1612 may send such a request in response to receiving an attestation request from a remote device or the orchestration server 1520 to attest one or more parameters of the managed node 1630 (e.g., prior to executing a workload on the managed node 1630). The request may include an identifier of the managed node 1630. The blockchain service 1604 may retrieve a blockchain associated with the managed node 1630 using one of the identifiers. The blockchain service 1604 may validate, e.g., using a public key included with key pair data 1904, the blockchain associated with the managed node 1630. Once validated, the blockchain service 1604 may return an indication that the blockchain is valid, which allows the attestation service 1612 to attest requested parameters. For example, the indication may include a digest or report that includes a history of the managed node 1630 from each update to the current state of the managed node 1630. The attestation service 1612 may also digitally sign a certificate attesting the required parameters.

Figure 20:
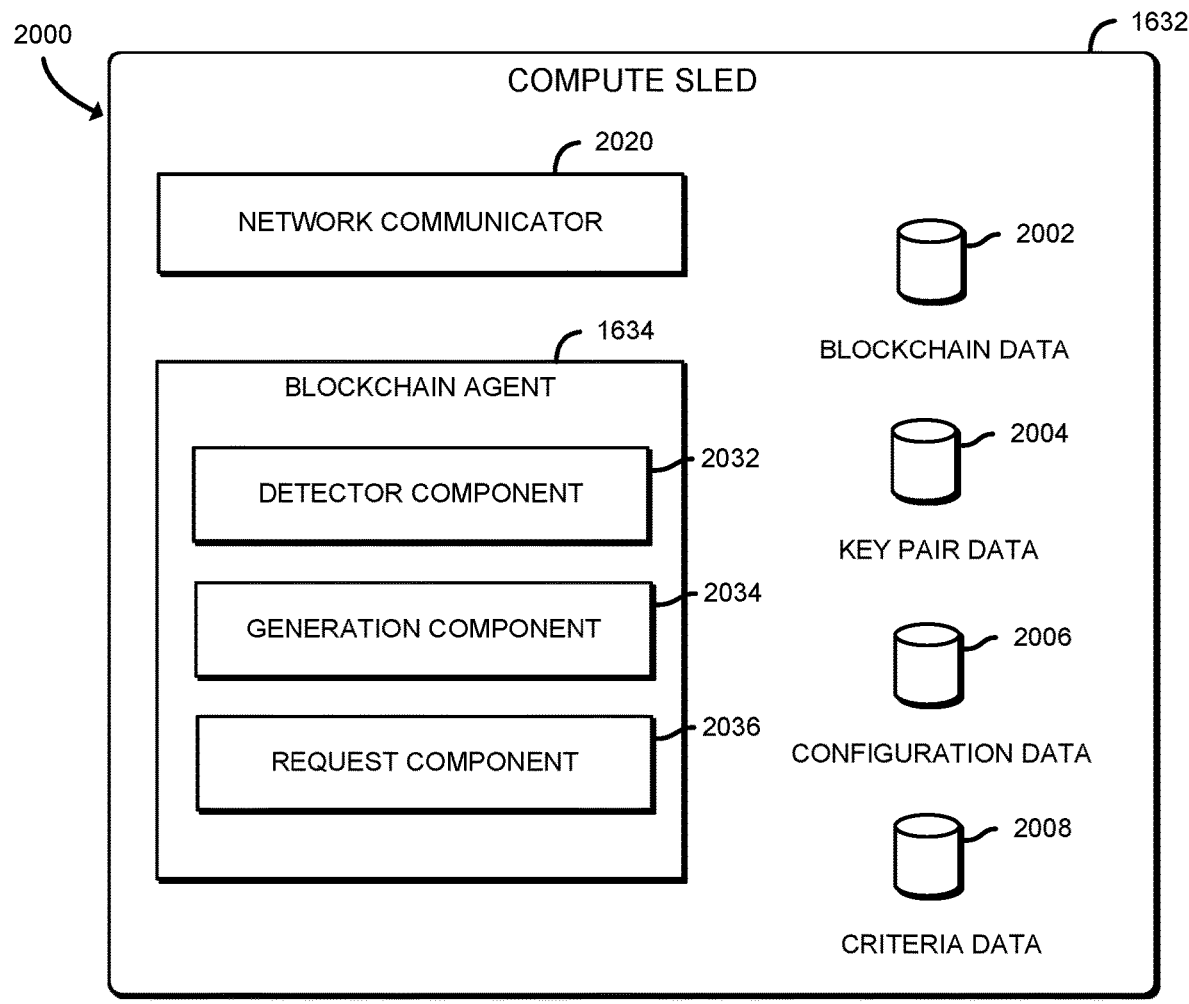
FIG. 20 is a simplified block diagram of at least one embodiment of an environment that may be established by a sled of a managed node.

Referring now to FIG. 20, each sled of the managed node 1630, such as the compute sled 1632 (or the accelerator sled 1642, memory sled 1652, etc.) may establish an environment 2000 during operation. The illustrative environment 2000 includes a network communicator 2020 and the blockchain agent 1634. Each of the components of the environment 2000 may be embodied as hardware, firmware, software, or a combination thereof. As such, in some embodiments, one or more of the components of the environment 2000 may be embodied as circuitry or a collection of electrical devices (e.g., network communicator circuitry 2020, blockchain agent circuitry 1634, etc.). It should be appreciated that, in such embodiments, one or more of the network communicator circuitry 2020 or blockchain agent circuitry 1634 may form a portion of one or more of the compute engine 1802, the communication circuitry 1810, the I/O subsystem 1808 and/or other components of the compute sled 1632. In the illustrative embodiment, the environment 2000 includes blockchain data 2002, which may be embodied as any data indicative of one or more blockchain structures generated and maintained for the sled. The environment 2000 also includes key pair data 2004, which may be embodied as any data indicative of a cryptographic key data (e.g., public and private key pairs) associated with each blockchain of the blockchain data 2002. The compute sled 1632 may generate the key pair data 2004 using a variety of cryptographic techniques. The compute sled 1632 thereafter makes the public key of the key pair data 2004 available to the blockchain service 1604. In turn, the blockchain service 1604 may associate the public key with the particular compute sled 1632 and use the public key to authenticate data from the composed node's blockchain agent (e.g., the block chain agent will sign any data sent to the blockchain service 1604 using the private key of the key pair data 2004). The environment 2000 also includes configuration data 2006, which may be embodied as any data indicative of configuration and specifications for the compute sled 1632, such as hardware components available on the compute sled 1632, serial numbers associated with the hardware components, software installed on the compute sled 1632, firmware version, operating system version, workloads executed on the compute sled 1632, data center location, rack location, geolocation, and so on. The environment 2000 also includes criteria data 2008, which may be embodied as any data indicative of conditions which, if detected, trigger the compute sled 1632 (via the blockchain agent 1634) to send updated parameters to the blockchain service 1604.

In the illustrative environment 2000, the network communicator 2020, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from the compute sled 1632, respectively. To do so, the network communicator 2020 is configured to receive and process data packets from one system or computing device (e.g., a compute sled 1632, the orchestrator server 1520, client device 1608, etc.) and to prepare and send data packets to a computing device or system (e.g., the compute sled 1632, the orchestrator server 1220, etc.). Accordingly, in some embodiments, at least a portion of the functionality of the network communicator 1920 may be performed by the communication circuitry 1710, and, in the illustrative embodiment, by the NIC 1712.

The blockchain agent 1634, which may be embodied as hardware, firmware, software, virtualized hardware, emulated architecture, and/or a combination thereof, is to generate a manifest of a current configuration of the compute sled 1632. More particularly, the manifest may include a description of hardware, software, and firmware currently installed with the compute sled 1632. The blockchain agent 1634 may send the manifest to the blockchain service 1604. Further, the blockchain agent 1634 is also to monitor runtime processes of the compute sled 1632 and report changes in parameters (e.g., firmware, operating system, installed software, installed hardware components and drivers, geolocation, workload execution, etc.) to the blockchain service 1604. In some embodiments, the blockchain agent 1634 is also to monitor the processes against criteria data 2008 to determine whether some change in the compute sled 1632 triggers the blockchain agent 1634 to report to the blockchain service 1604. To do so, the blockchain agent 1634 includes a detector component 2032, a generation component 2034, and a request component 2036.

The detector component 2032 is configured to monitor, in the compute sled 1632, runtime processes and control messages by the orchestrator server 1520. As an example, the detector component 2032 may evaluate control messages from the orchestrator server 1520, e.g., to determine whether the compute sled 1632 is to be powered down. The detector component 2032 may determine whether the monitored activity triggers any of the criteria 2008. For example, the criteria 2008 may specify to report to the blockchain service 1602 with changes if a geolocation in the compute sled 1632 is in a different location than previous.

The generation component 2034 is configured to compile one or more changes that occurred based on the trigger in change criteria and format the changes for the blockchain service 1604. The request component 2036 is configured to send the compiled changes to the blockchain service 1604 in the form of a request to update the blockchain. The request may include an identifier associated with the compute sled 1632 or a workload identifier. The request component 2036 may thereafter receive an acknowledgement from the blockchain service 1604 which includes the most recent iteration of the blockchain associated with the compute sled 1632.

Note, although the above refers to the environment 2000 as applied to the compute sled 1632, one of skill in the art will recognize that the environment 2000 may similarly apply to other sleds of the managed node 1630, such as the accelerator sled 1642 and memory sled 1652. For instance, the blockchain agent 1644 of the accelerator sled 1642 (or the blockchain agent 1654 of the memory sled 1652) may perform similar functions as described relative to the blockchain agent 1632.

Figure 21:
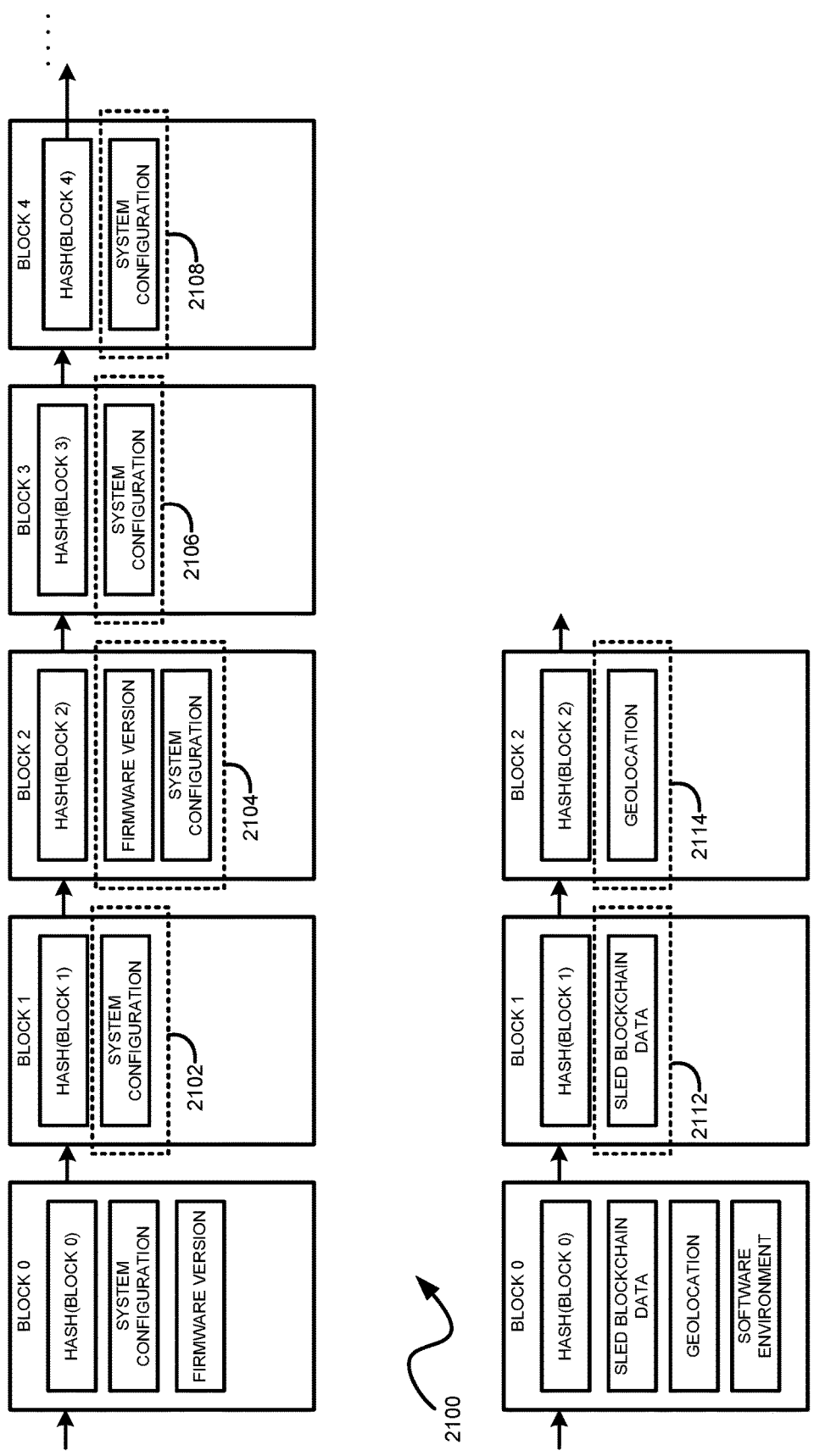
FIG. 21 is a simplified block diagram of an example of a sled blockchain and a managed node blockchain used to attest to a user that a compute sled or a managed node executing a workload conforms to a specified configuration.

Referring now to FIG. 21, an illustrative sled blockchain 2100 and managed node blockchain 2110 created according to the embodiments disclosed herein is shown. Generally, blockchain information for a given sled may be initiated by a vendor or manufacturer. New blocks may be added to the blockchain 2100 as changes are made to the hardware or firmware of the sled. As shown, the blockchain 2100 is a structure that includes multiple blocks, block 0, block 1, block 2, block 3, block 4, and so on. Block 0 is representative of an initial block entry for the blockchain. For instance, the blockchain service 1604 may generate the block 0 in the event that the vendor system 1606 sends system specifications of a compute sled 1632 prior to manufacture of the compute sled 1632. Illustratively, the block 0 includes parameters such as system configuration and firmware version. System configuration may include information such as hardware components, device drivers, physical resources, and the like. As further shown, block 0 also includes a hash of the contents of block 0 (e.g., the system configuration and the firmware version). The hash value of block 0 may be representative of a value generated from a hash function that receives the contents of the block as input. Block 0 may also include other data not depicted in FIG. 21, such as an index indicative of the position of the block in the blockchain and a timestamp indicative of a date and time of when the block was generated.

Illustratively, each subsequent block of the blockchain includes a hash generated from the block contents and of the hash of the previous block. Further, each block includes additional changes 2102, 2104, 2106, and 2108, which are indicative of changes to the compute sled 1632 throughout the life cycle of the compute sled. For example, change 2102 is indicative of a change in the system configuration, as depicted in block 1. In such an example, the change in system configuration may correspond to serial numbers of hardware components added to the compute sled 1632. As another example, change 2104 is indicative of a change in the firmware version and system configuration. Changes 2106 and 2108 are indicative of incremental changes in system configuration.

The blockchain 2110 is representative of a managed node blockchain. Generally, a managed node blockchain may be in existence for as long as the managed node exists and is not decomposed. Block 0 of the blockchain 2110 represents the initial state of each of the sleds forming the managed node 1630 at composition time of the managed node 1630. For instance, block 0 includes sled blockchain data, which is representative of information associated with each sled based on the information provided with a corresponding blockchain to that sled. Block 0 also includes geolocation information indicative of the geolocation in which the managed node operates. Block 0 also includes software environment information indicative of the software environment in which the managed node executes workloads. Each of the sled blockchain data, geolocation, and software environment may be parameters that can be attested (e.g., via the attestation service 1612) to ensure that the managed node is configured as expected. In the event that changes are made to certain parameters, such as changes to an individual sled (based on updated blockchain data for that sled) or to geolocation, the blockchain service 1604 may add a new block to the managed node blockchain. For instance, in block 1, a change 2112 to the sled blockchain data is depicted. In the event that an individual sled blockchain is updated, the orchestrator server may initiate a request to the blockchain service 1604 to update the blockchain for that individual sled. The orchestrator server may also send a request to update the corresponding managed node blockchain with the updated information. Change 2114 represents a change in the geolocation for the managed node. In the event that a managed node changes geolocation, the orchestrator server may send a request to the blockchain service 1604 to update the managed node.

A client device requesting to attest a given parameter, such as ensuring that the geolocation has not changed in deploying workload A, may send a request to the attestation service 1612. In response, the attestation service 1612 may evaluate each block in the blockchain to determine at what stage of the lifecycle of the managed node 1630 deployed the workload A. The attestation service 1612 may trace the chain of blocks leading to the blockchain entry to also determine that the geolocation is in a given locale. Once determined, the attestation service 1612 may generate an attestation (e.g., a digest or a digital certificate) indicating the requested parameters.

Figure 22:
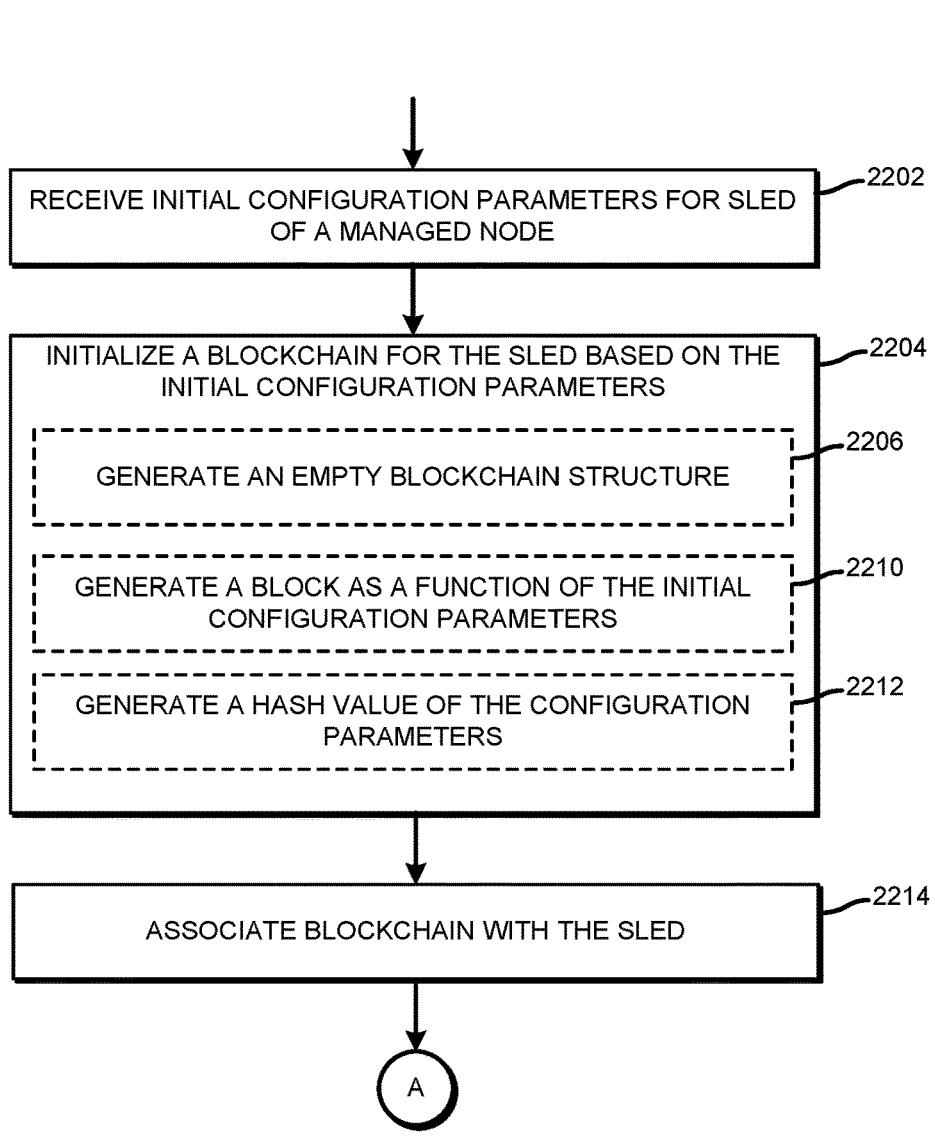
FIG. 22 is a simplified flow diagram of a method for initializing a blockchain for a compute sled.

Referring now to FIG. 22, the distributed compute device 1602 (e.g., via the blockchain service 1604), in operation, may perform a method 2200 for initializing a blockchain for a sled in the managed node 1630 (e.g., the compute sled 1632). As shown, the method 2200 begins in block 2202, in which the distributed compute device 1602 receives initial configuration parameters for the sled. For example, the initial configuration parameters may include a specification of hardware, operating system, and operating parameters (e.g., geolocation, data center location, and the like) for the sled.

In block 2204, the distributed compute device 1602 initializes a blockchain for the sled. For instance, in block 2206, the distributed compute device 1602 generates an empty blockchain structure to associate with the sled. In block 2208, the distributed compute device 1602 generates a block entry indicative of a transaction including the received initial configuration parameters. The block entry serves as an initial block for the generated blockchain structure. The block entry may include, in addition to the configuration parameters, an index for the block entry and a timestamp indicative of the creation of the block entry. In block 2210, the distributed compute device 1602 generates a hash value from the configuration parameters. For instance, the distributed compute device 1602 may perform a hash function that takes in, as input, the configuration parameters. The hash function may also take in other values for further security, such as a nonce.

In block 2214, the distributed compute device 1602 associates the initialized blockchain with the sled. For instance, the distributed compute device 1602 may generate an identifier to store with the blockchain for subsequent lookup (e.g., in instances where the blockchain is to be updated or parameters associated with the sled are to be attested). Further, the distributed compute device 1602 may distribute the blockchain (and identifier) to other distributed compute devices 1602.

Figure 23:
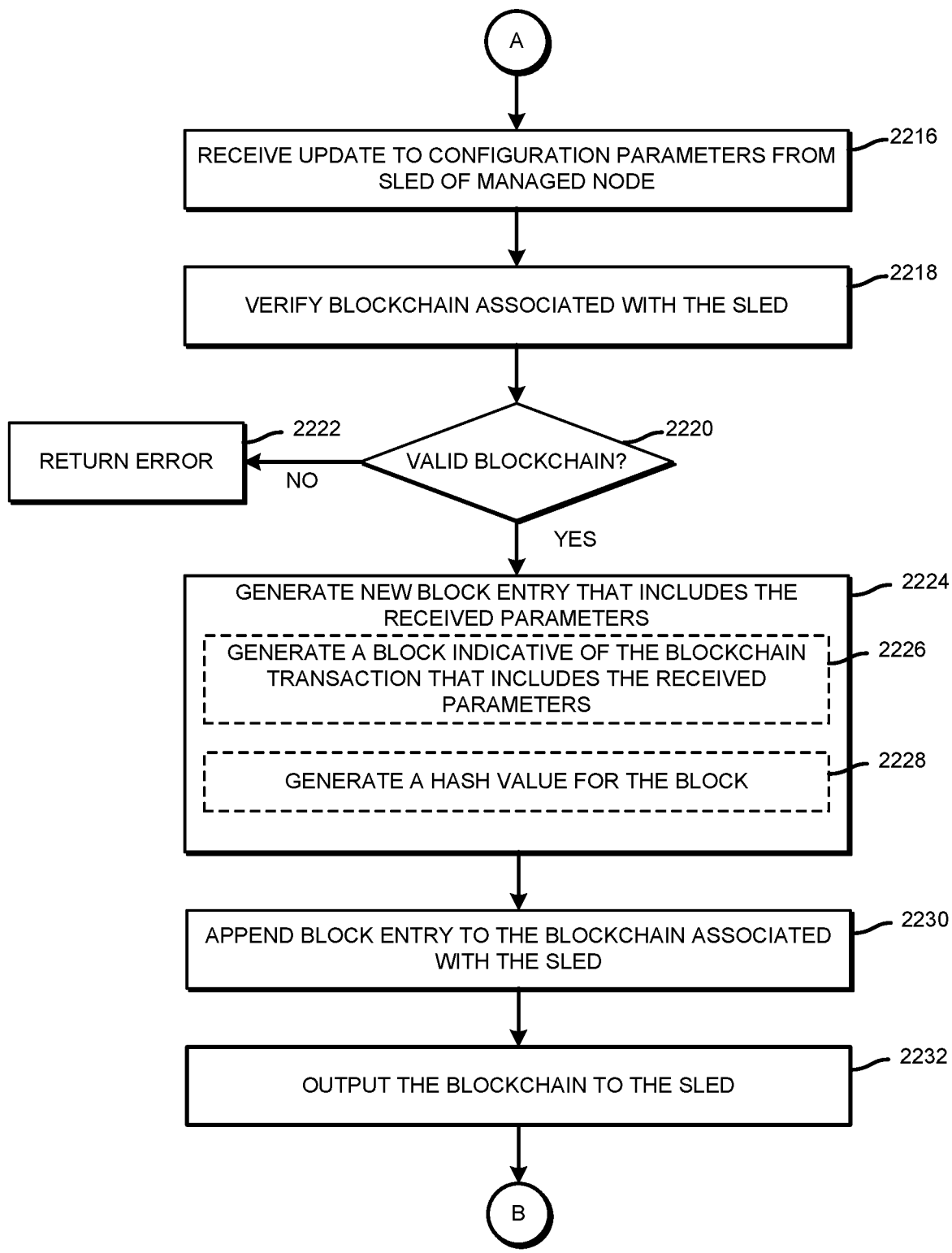
FIG. 23 a simplified flow diagram of a method for updating a blockchain associated with a compute sled based on changes on the compute sled.

Referring now to FIG. 23, the distributed compute device 1602 (via the blockchain service 1604), in operation, may update the blockchain associated with the sled of the managed node in instances where the sled undergoes changes in configuration parameters (e.g., new hardware components are installed on the sled, the sled changes geolocation, a new firmware version is installed on the sled, and the like) or deploys a user workload. In block 2216, the distributed compute device 1602 receives an update to configuration parameters from the sled. In some cases, the distributed compute device 1602 may receive the updated configuration parameters from the orchestration server 1520 (e.g., in cases where the sled is brought offline). The distributed compute device 1602 may identify the blockchain associated with the sled, e.g., by an identifier included with the update sent by the sled.

In block 2218, the distributed compute device 1602 validates the blockchain associated with the sled. The distributed compute device 1602 may do so by evaluating the hash values linking each block with one another in the blockchain. More particularly, each block (other than the initial block in the blockchain structure) includes a hash value of the previous block in the blockchain. The distributed compute device 1602 may ensure that the previous hash value included with a current block matches the actual hash value in the preceding block. In block 2220, the distributed compute device 1602 determines, based on the evaluation, whether the blockchain is valid. If not, then in block 2222, the distributed compute device 1602 returns an error to the sled (or to the orchestrator server 1520).

Otherwise, in block 2224, the distributed compute device 1602 generates a new block entry that includes the received parameters. More particularly, in block 2226, the distributed compute device 1602 generates a block indicative of a transaction that includes the parameters. The block may also include an index and a creation timestamp. Further, in block 2228, the distributed compute device 1602 generates a hash value for the block. More specifically, the distributed compute device 1602 may perform a hash function using, in part, the updated parameters as input. The distributed compute device 1602 may also include other parameters, such as a nonce, in the generation of the hash value.

In block 2230, the distributed compute device 1602 appends the generated block entry to the existing blockchain structure associated with the sled. To do so, the distributed compute device 1602 includes a hash value of the previous block in the generated block entry. In block 2232, the distributed compute device 1602 sends the updated blockchain to the sled, orchestrator service 1520, and an associated managed node 1630 (e.g., in the event that the sled is part of the managed node 1630). Further, the distributed compute device 1602 may propagate the updated blockchain to other peers (e.g., other distributed compute devices 1602).

Figure 24:
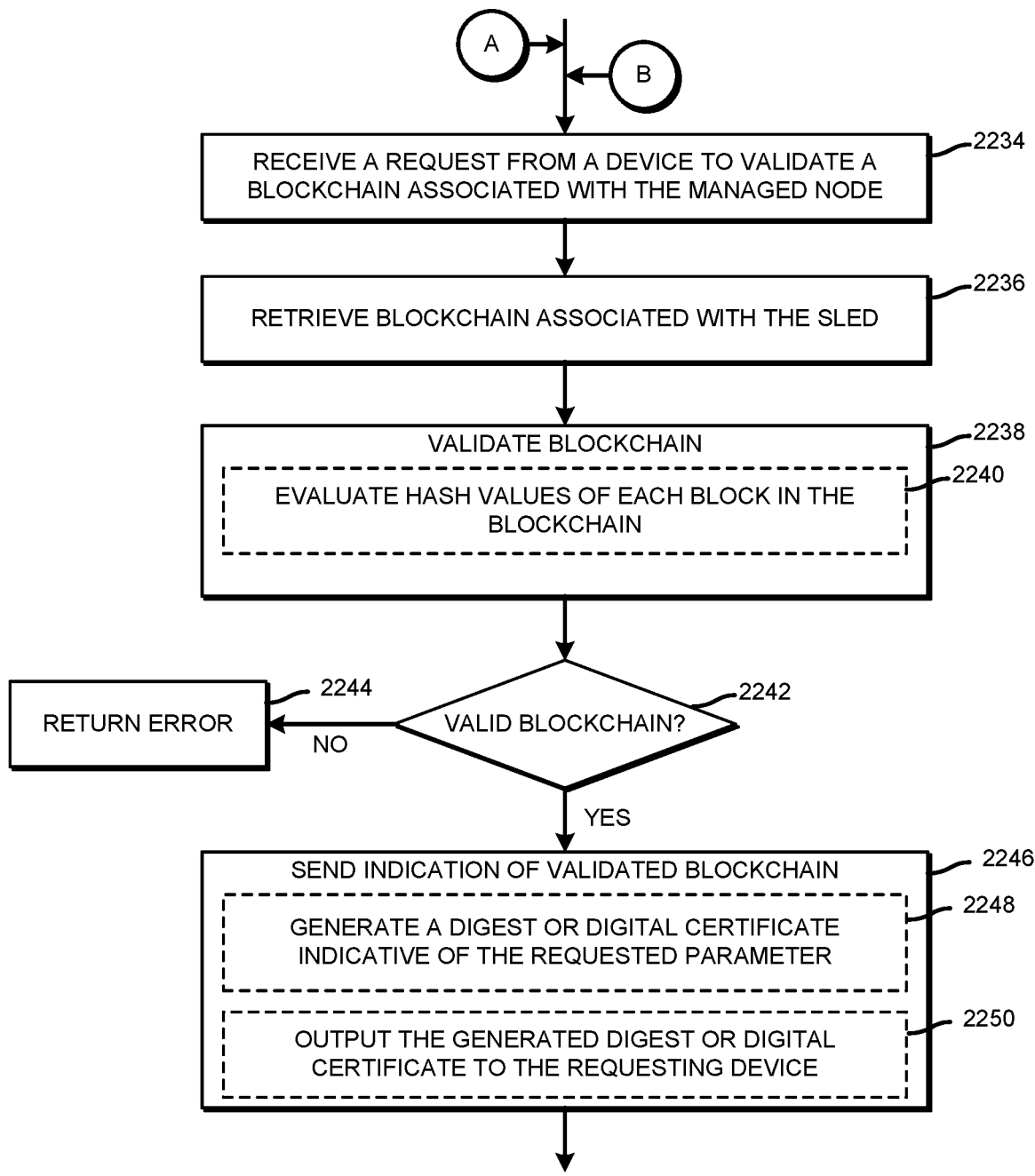
FIG. 24 is a simplified flow diagram of a method for attesting one or more parameters associated with a given compute sled using a blockchain associated with that compute sled.

Referring now to FIG. 24, the distributed compute device 1602, in operation, may handle attestation requests for one or more of the configuration parameters and workload deployment of the a sled of the managed node 1630 in response to a request from a remote device (e.g., a client device 1608) using the associated blockchain. In block 2234, the distributed compute device 1602 receives a request (e.g., from the attestation service 1612) to validate one or more blockchains associated with a managed node 1630 (or an individual sled, such as compute sled 1632). For example, the request may include an identifier for the managed node 1630 used by the blockchain service 1604, an identifier for a workload (if the attestation is for a workload), or other identifying information for the managed node 1630.

In block 2236, the distributed compute device 1602 retrieves the one or more blockchains associated with the managed node 1630. For example, the distributed compute device 1602 may perform a lookup operation in a data store storing the blockchain(s) using a provided identifier. Once retrieved, in block 2238, the distributed compute device 1602 validates the one or more blockchains. For example, in block 2240, the distributed compute device 1602 may do so by evaluating the hash values linking each block with one another in a given blockchain. The distributed compute device 1602 may ensure that the previous hash value included with a current block matches the actual hash value in the preceding block. In block 2242, the distributed compute device 1602 determines, based on the evaluation, whether a given blockchain is valid. If not, then in block 2244, the distributed compute device 1602 returns an error to the requesting device.

Otherwise, in block 2246, the distributed compute device 1602 sends the indication of the valid blockchains to the requesting device. For example, in block 2248, the distributed compute device 1602 may generate a digest or digital certificate indicative of an attestation of the requested parameter. The digest may include a transactional history of the distributed compute device 1602 relating to the parameter. For example, in a case where a workload is being attested, the digest may include geolocation history, firmware version history, and physical resource history leading up through the deployment of the workload. Further, the distributed compute device 1602 may digitally sign the digest or digital certificate (e.g., with key pair data 1904)

once generated. In block 2250, the distributed compute device 1602 outputs the generated digest (or digital certificate) to the requesting device.

Figure 25:
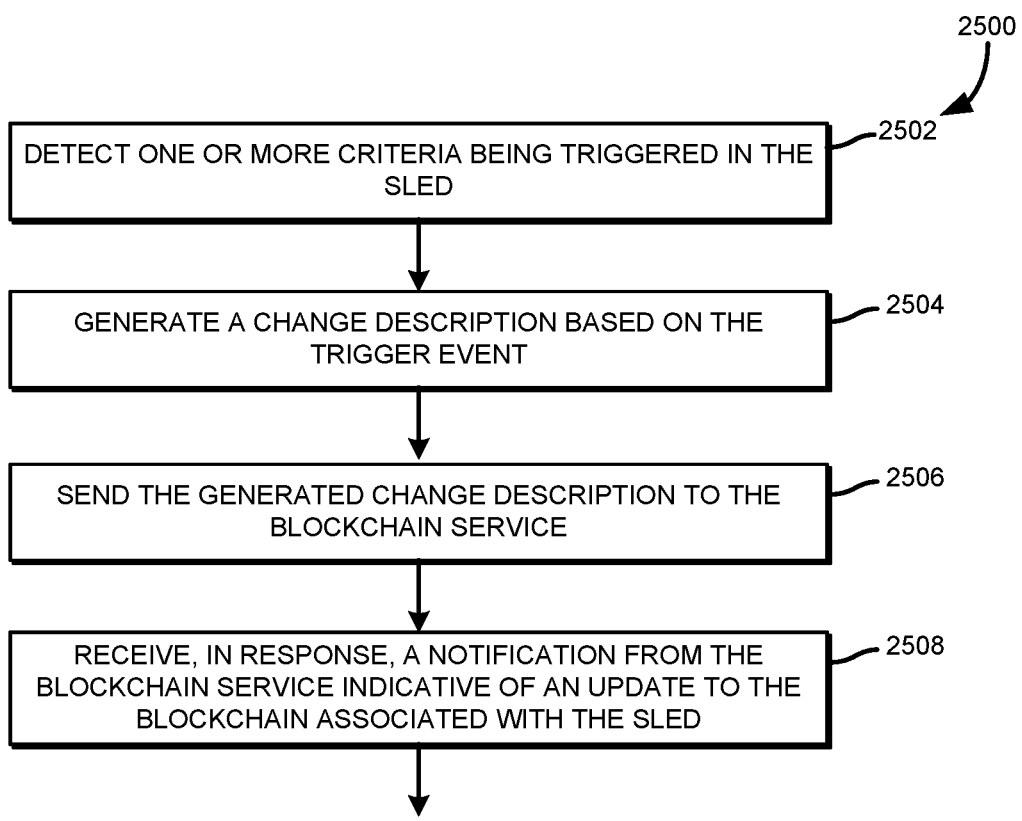
FIG. 25 is a simplified flow diagram of a method for determining that a change to be recorded in a blockchain has occurred on the compute sled.

Referring now to FIG. 25, each sled of the managed node 1630 (e.g., the compute sled 1632, accelerator sled 1642, or memory sled 1652) in operation, may perform a method 2500 (e.g., via the blockchain agent) for communicating changes in configuration parameters (or execution of a workload) to the blockchain service 1604. In block 2502, the sled detects one or more criteria being triggered in the sled 1632. For example, the blockchain agent may detect the presence of a new hardware component installed on the sled. As another example, the blockchain agent may detect that a workload begins executing on the sled (e.g., as part of the managed node 1630).

Once detected, in block 2504, the sled generates a change description based on the triggering event. The change description generally includes information used by the blockchain service 1604 to create a block entry with a blockchain associated with the sled. Continuing the previous example of the new hardware component, the change description may include a timestamp associated with the addition of the hardware component, a description of the hardware component, a serial number and/or identifier associated with the hardware component, specifications of the hardware component, and the like. With regard to the workload example, the change description may include a user associated with the workload, resource requirements of the workload, accelerator bit streams associated with the workload, a timestamp indicative of the execution of the workload, and the like.

In block 2506, the sled sends the generated change description to the blockchain service 1604. In turn, the blockchain service 1604 may update the blockchain associated with the sled based on the change description. In block 2508, the sled may receive, in response to sending the generated change description, a notification from the blockchain service 1604 indicative of an update to the blockchain. For example, the sled may receive a copy of the updated blockchain from the blockchain service 1604.

EXAMPLES

Illustrative examples of the technologies disclosed herein are provided below. An embodiment of the technologies may include any one or more, and any combination of, the examples described below.

Example 1 includes a compute device comprising communication circuitry to receive a request from a remote device to validate one or more parameters of a managed node composed of one or more sleds; a compute engine to retrieve a blockchain associated with the managed node, wherein the blockchain includes a plurality of blocks, each block including information about one or more of the parameters of the managed node; validate the blockchain; and in response to a successful validation of the blockchain, send an indication that the blockchain is valid to the requesting remote device.

Example 2 includes the subject matter of Example 1, and wherein to receive the request from the remote device to validate one or more parameters of the managed node comprises to receive a request to attest that the managed node is executed according to a specified configuration.

Example 3 includes the subject matter of any of Examples 1 and 2, and wherein to receive the request from the remote device is to receive a request to attest at least one of a geolocation, a system configuration, or a firmware version associated with the managed node.

Example 4 includes the subject matter of any of Examples 1-3, and wherein to validate the blockchain comprises to evaluate a hash value in each of the plurality of blocks in the blockchain.

Example 5 includes the subject matter of any of Examples 1-4, and wherein the compute engine is further to generate a digest indicative of the one or more parameters.

Example 6 includes the subject matter of any of Examples 1-5, and wherein the compute engine is further to receive update parameters from one of the sleds of the managed node; generate a new block that includes the received update parameters; and append the block to the blockchain.

Example 7 includes the subject matter of any of Examples 1-6, and wherein to receive the update parameters from the one of the sleds of the managed node is to receive at least one of an update to a system configuration of the sled, an update to a firmware version associated with the sled, or an indication of the sled being offline.

Example 8 includes the subject matter of any of Examples 1-7, and wherein to generate the new block that includes the received update parameters comprises to generate a block indicative of a blockchain transaction that includes the received parameters; and generate a hash value for the block, wherein the hash value is determined, in part, from the received update parameters.

Example 9 includes the subject matter of any of Examples 1-8, and wherein the compute engine is further to, in response to a determination that the blockchain is not valid, return an error.

Example 10 includes the subject matter of any of Examples 1-9, and wherein to receive the update parameters from the managed node comprises to receive the update parameters in response to the managed node detecting a change in the one or more parameters of the managed node.

Example 11 includes one or more machine-readable storage media comprising a plurality of instructions stored thereon that, in response to being executed, causes a compute device to receive a request from a remote device to validate one or more parameters of a managed node composed of one or more sleds; retrieve a blockchain associated with the managed node, wherein the blockchain includes a plurality of blocks, each block including information about one or more of the parameters of the managed node; validate the blockchain; and in response to a successful validation of the blockchain, send an indication that the blockchain is valid to the requesting remote device.

Example 12 includes the subject matter of Example 11, and wherein to receive the request from the remote device to validate one or more parameters of the managed node comprises to receive a request to attest that the managed node is executed according to a specified configuration.

Example 13 includes the subject matter of any of Examples 11 and 12, and wherein to receive the request from the remote device is to receive a request to attest at least one of a geolocation, a system configuration, or a firmware version associated with the managed node.

Example 14 includes the subject matter of any of Examples 11-13, and wherein to validate the blockchain comprises to evaluate a hash value in each of the plurality of blocks in the blockchain.

Example 15 includes the subject matter of any of Examples 11-14, and wherein the plurality of instructions further causes the compute device to generate a digest indicative of the one or more parameters.

Example 16 includes the subject matter of any of Examples 11-15, and wherein the plurality of instructions further causes the compute device to receive update parameters from the one of the sleds of the managed node; generate a new block that includes the received update parameters; and append the block to the blockchain.

Example 17 includes the subject matter of any of Examples 11-16, and wherein to receive the update parameters from one of the sleds of the managed node is to receive at least one of an update to a system configuration of the sled, an update to a firmware version associated with the sled, or an indication of the sled being offline.

Example 18 includes the subject matter of any of Examples 11-17, and wherein to generate the new block that includes the received update parameters comprises to generate a block indicative of a blockchain transaction that includes the received parameters; and generate a hash value for the block, wherein the hash value is determined, in part, from the received update parameters.

Example 19 includes the subject matter of any of Examples 11-18, and wherein the plurality of instructions further causes the compute device to, in response to a determination that the blockchain is not valid, return an error.

Example 20 includes the subject matter of any of Examples 11-19, and wherein to receive the update parameters from the managed node comprises to receive the update parameters in response to the sled detecting a change in the one or more parameters of the managed node.

Example 21 includes a method comprising receiving, by a compute device, a request from a remote device to validate one or more parameters of a managed node composed of one or more sleds; retrieving, by the compute device, a blockchain associated with the managed node, wherein the blockchain includes a plurality of blocks, each block including information about one or more of the parameters of the managed node; validating, by the compute device, the blockchain; and in response to a successful validation of the blockchain, sending, by the compute device, an indication that the blockchain is valid to the requesting remote device.

Example 22 includes the subject matter of Example 21, and wherein receiving the request from the remote device comprises receiving a request to attest at least one of a geolocation, a system configuration, or a firmware version associated with the managed node.

Example 23 includes the subject matter of any of Examples 21 and 22, and further including generating, by the compute device, a digest indicative of the one or more parameters.

Example 24 includes a compute device, comprising circuitry for receiving a request from a remote device to validate one or more parameters of a managed node composed of one or more sleds; circuitry for retrieving, by the compute device, a blockchain associated with the managed node, wherein the blockchain includes a plurality of blocks, each block including information about one or more of the parameters of the managed node; means for validating, by the compute device, the blockchain; and means for, in response to a successful validation of the blockchain, sending, by the compute device, an indication that the blockchain is valid to the requesting remote device.

Example 25 includes the subject matter of Example 24, and further including circuitry for receiving update parameters from the managed node; means for generating a new block that includes the received update parameters; and means for appending the block to the blockchain.

The invention claimed is:

1. A compute device comprising:
    circuitry to:
        use a blockchain to manage configuration of a managed node, the managed node including a circuit board, a first block in the blockchain including circuit board blockchain data representative of circuit board parameters provided by a circuit board blockchain, a first block in the circuit board blockchain including system configuration parameters, a second block in the circuit board blockchain including changes indicative of changes to the managed node including changes in the system configuration parameters;
        validate the blockchain; and
        in response to a successful validation of the blockchain, send an indication that the blockchain is valid to a remote device.

2. The compute device of claim 1, wherein the system configuration parameters includes geolocation of the managed node.

3. The compute device of claim 1, wherein to validate the blockchain comprises to evaluate a hash value in each of a plurality of blocks in the blockchain.

4. The compute device of claim 1, wherein the circuitry is further to, in response to a determination that the blockchain is not valid, return an error.

5. The compute device of claim 1, wherein the circuitry is further to generate a digest indicative of the system configuration parameters.

6. The compute device of claim 1, wherein the circuitry is further to:
    receive update parameters from the managed node, the update parameters including at least one of an update to a system configuration or an update to a firmware version.

7. The compute device of claim 6, wherein to receive the update parameters from the managed node comprises to receive the update parameters in response to the managed node detecting a change in one or more parameters of the managed node.

8. The compute device of claim 1, wherein the managed node comprising disaggregated resources.

9. One or more non-transitory machine-readable storage media comprising a plurality of instructions stored thereon that, in response to being executed, cause a compute device to:
    use a blockchain to manage configuration of a managed node, the managed node including a circuit board, a first block in the blockchain including circuit board blockchain data representative of circuit board parameters provided by a circuit board blockchain, a first block in the circuit board blockchain including system configuration parameters, a second block in the circuit board blockchain including changes indicative of changes to the managed node including changes in the system configuration parameters;
    validate the blockchain; and
    in response to a successful validation of the blockchain, send an indication that the blockchain is valid to a remote device.

10. The one or more non-transitory machine-readable storage media of claim 9, wherein the system configuration parameters includes geolocation of the managed node.

11. The one or more non-transitory machine-readable storage media of claim 9, wherein to validate the blockchain comprises to evaluate a hash value in each of a plurality of blocks in the blockchain.

12. The one or more non-transitory machine-readable storage media of claim 9, wherein the plurality of instructions, when executed, further cause the compute device to:
in response to a determination that the blockchain is not valid, return an error.

13. The one or more non-transitory machine-readable storage media of claim 9, wherein the plurality of instructions, when executed, further cause the compute device to:
generate a digest indicative of the system configuration parameters.

14. The one or more non-transitory machine-readable storage media of claim 9, wherein the plurality of instructions, when executed, further cause the compute device to:
receive update parameters from the managed node, the update parameters including at least one of an update to a system configuration or an update to a firmware version.

15. The one or more non-transitory machine-readable storage media of claim 14, wherein to receive the update parameters from the managed node comprises to receive the update parameters in response to the managed node detecting a change in one or more parameters of the managed node.

16. A method comprising:
managing nodes in a data center using a blockchain, each node including a circuit board, the blockchain comprising multiple blocks, blocks linked to one another based on cryptography, the blocks of the block chain corresponding to system configuration parameters of the nodes, a first block in the blockchain including circuit board blockchain data representative of circuit board parameters provided by a circuit board blockchain;
validating the blockchain; and
in response to a successful validation of the blockchain, sending an indication that the blockchain is valid to a remote device.

17. The method of claim 16, wherein the system configuration parameters include geolocation of the managed node.

18. The method of claim 16, wherein validating the blockchain comprising:
evaluating a hash value in each of a plurality of blocks in the blockchain.

19. The method of claim 16, further comprising:
generating a digest indicative of the system configuration parameters.

* * * * *